(12) United States Patent
Yoshimoto et al.

(10) Patent No.: US 6,993,029 B2
(45) Date of Patent: *Jan. 31, 2006

(54) IP SWITCH, INTERFACE CIRCUIT AND ATM SWITCH USED FOR IP SWITCH, AND IP SWITCH NETWORK SYSTEM

(75) Inventors: Tetsuro Yoshimoto, Yokohama (JP); Kazuho Miki, Yokohama (JP); Akihiko Takase, Tokyo (JP)

(73) Assignee: Hitachi, Ltd. (JP)

( * ) Notice: Subject to any disclaimer, the term of this patent is extended or adjusted under 35 U.S.C. 154(b) by 82 days.

This patent is subject to a terminal disclaimer.

(21) Appl. No.: 10/370,285

(22) Filed: Feb. 19, 2003

(65) Prior Publication Data

US 2003/0152085 A1 Aug. 14, 2003

Related U.S. Application Data

(63) Continuation of application No. 09/776,283, filed on Feb. 2, 2001, now Pat. No. 6,526,045, which is a continuation of application No. 08/998,382, filed on Dec. 24, 1997, now Pat. No. 6,304,555.

(30) Foreign Application Priority Data

Dec. 25, 1996 (JP) ............................................. 8-344981

(51) Int. Cl.
*H04L 12/56* (2006.01)
*H04L 12/28* (2006.01)

(52) U.S. Cl. .............................. 370/395.2; 370/395.52; 370/395.5; 370/389; 709/238

(58) Field of Classification Search ................. 370/232, 370/395.52, 397, 401, 466, 470, 474, 352, 370/353, 395.2, 354, 389, 392, 395, 398, 370/399, 400, 2.54, 230, 235; 379/112.01, 379/112.08, 221.15, 229; 709/238, 249, 250
See application file for complete search history.

(56) References Cited

U.S. PATENT DOCUMENTS

| | | | | |
|---|---|---|---|---|
| 5,359,600 | A | * 10/1994 | Ueda et al. | 370/399 |
| 5,678,060 | A | 10/1997 | Yokoyama et al. | 395/831 |
| 5,764,740 | A | 6/1998 | Holender | 379/112 |
| 5,956,339 | A | * 9/1999 | Harada et al. | 370/400 |
| 5,958,339 | A | 9/1999 | Belly | 422/56 |

(Continued)

FOREIGN PATENT DOCUMENTS

| EP | 402471 A | 12/1990 |
|---|---|---|
| EP | 502436 A | 9/1992 |

(Continued)

OTHER PUBLICATIONS

European Search Report.
Anthony Alles, "ATM Internetworking," Sep. 1995, p. 121.

(Continued)

*Primary Examiner*—Afsar Qureshi
(74) *Attorney, Agent, or Firm*—Sofer & Haroun, LLP

(57) ABSTRACT

In a system in which communication is performed among a plurality of devices having a mechanism of disassembling a packet into ATM cells to send them and a plurality of devices having a mechanism of assembling the received ATM cells into the packet, a frame is prevented from being lost owing to change of virtual connections in the course of transferring the frame, improving reliability of the communication on the packet level. When the switch receives a request for change of switching, it does not processes that request at once, but confirms that the cell located at the boundary of the frame has been processed, before processing the change request, so as to protect the frame. When the switch receives a request for change of switching, it protects a frame by multicasting the cells to both destinations before change and after change, for a given period of time.

4 Claims, 26 Drawing Sheets

U.S. PATENT DOCUMENTS

| | | | | |
|---|---|---|---|---|
| 6,049,999 | A | 4/2000 | Skaugen et al. | 34/453 |
| 6,108,304 | A | 8/2000 | Abe et al. | 370/232 |
| 6,275,494 | B1 | 8/2001 | Endo et al. | 370/395 |
| 6,304,555 | B1 * | 10/2001 | Yoshimoto et al. | 370/254 |
| 6,526,045 | B2 * | 2/2003 | Yoshimoto et al. | 370/352 |
| 6,667,985 | B1 * | 12/2003 | Drummond-Murray | 370/415 |

FOREIGN PATENT DOCUMENTS

| | | | | |
|---|---|---|---|---|
| EP | 554859 | A | 8/1993 | |
| EP | 597487 | A | 5/1994 | |
| EP | 0597487 | | 5/1994 | 12/56 |
| GB | 2281005 | A * | 2/1995 | |
| GB | 2281005 | | 2/1995 | |
| JP | 4260245 | | 9/1992 | |
| JP | 4276943 | | 10/1992 | |
| JP | 8125692 | | 5/1996 | |
| JP | 9181740 | | 7/1997 | |
| JP | 9247169 | | 9/1997 | |
| WO | 9217014 | | 10/1992 | |
| WO | 9607281 | | 3/1996 | |
| WO | 9748214 | | 12/1997 | 12/56 |

OTHER PUBLICATIONS

"ATM Forum UNI version 3.1," PTR Prentice Hall Prentice–Hall, Inc., 1995.

Lixia Zhang et al., "RSVP: A New Resource ReSerVation Protocol", IEEE Network, Sep. 1993.

Juha Heinanen, " Multiprotocol Encapsulation Over ATM Adapatatiion Layer 5," Request for Comments: 1483, Jul. 1993.

"Data Structure and Algorithm"; Baifukan Co., Ltd., Mar. 1987, p. 239.

"ABR Flow Control", Traffic Management Specification Version 4.0.

K. Sklower et al., "The PPP Multilink Protocol (MP)," Aug. 1996.

Markus Burak "Connectionless Services in an ATM–LAN Provided by a CL–Server an Implementation and Case Study" dated Nov. 28, 1994.

Newman, et al. "FlowLabelled IP: A Connection Less Approach to ATM," Ipsilon Networks Inc., Mar. 1996.

European Search Report dated Oct. 10, 2003.

Self Sizing Network Operation Systems in ATM Networks by Nakagawa et al., NTT Telecommunication Networks Lab, dated Apr. 15, 1996.

ATM VP–Based Broadband Networks for Multimedia Services by Aoyama et al. IEEE Communications Magazine dated Apr. 31, 1993.

Centralized Virtual Path Bandwidth Allocation Scheme for ATM Networks by Logothetis et al, IEICE Transactions on Communications, dated Oct. 1992.

"A dynamically controllable ATM transport network based on the virtual path concept" 39.2.1 CH2535–3/88/ 0000–1272 $1.00 ©1988 IEEE. pp. 1272–1276.

* cited by examiner

IP SWITCH, INTERFACE CIRCUIT AND ATM SWITCH USED FOR IP SWITCH, AND IP SWITCH NETWORK SYSTEM

RELATED APPLICATIONS

This is a U.S. Continuation Application based on U.S. Continuation patent application Ser. No. 09/776,283 filed on Feb. 2, 2001 now U.S. Pat. No 6,526,045 which claims of continuation from U.S. patent application Ser. No. 08/998,382 filed on Dec. 24, 1997 now U.S. Pat. No. 6,304,555 and Japanese Patent Application No. 8-344981 filed Dec. 25, 1996, the entirety of which we incorporated herein by reference.

BACKGROUND OF THE INVENTION

1. Field of the Invention

The present invention relates to an IP switch (Internet Protocol switch) for transferring packet data in the lower layer of ATM (Asynchronous Transfer Mode), to an interface circuit and an ATM switch used for that IP switch, and to an IP switch network system.

2. Related Art Statement

At present, IP (Internet Protocol) is widely used as a protocol in computer communication in which data is divided into packets on a computer before transmission. According to the 7 layer model of OSI (Open System Interconnection), IP is the protocol which belongs to the network layer, and, to perform communication between different physical networks, communication is realized through routers.

However, it has been generally pointed out that it is difficult to make the IP router fast and to provide it with mass storage because of the characteristics of IP, and accordingly, even when high-speed lower layers are employed, their capacity can not be utilized sufficiently.

Recently, as a solution to these problems, there has been noted a technique called "IP Switching" proposed in *Flow Labeled IP: A Connectionless Approach to ATM* (Proc. IEEE Infocom, San Francisco, March 1996). This technique is one that introduces the arrangement of ATM (Asynchronous Transfer Mode) known as a high-speed communication technique into the ordinary IP, in an attempt to speed up the IP router.

SUMMARY OF THE INVENTION

In the above prior art, the process in the network layer, which is handled by software, is simplified as much as possible, to speed up the process, and retransmission by the cell is not taken into consideration. Accordingly, even if only one cell is lost, the whole frame containing that cell is discarded. As a result, when a virtual connection is changed in the middle of transfer of a frame, that frame is lost from the network.

Conventionally, in ATM, it is provided that a virtual connection is established in advance, and data is transferred on that line, presupposing that the transfer line is not changed in the middle of communication. Thus, there has not been such a problem as a packet being lost owing to change of a transfer line during the course of transfer.

In the IP switching technique, however, since a virtual connection is changed during the course of data transfer, it is possible that such loss of a packet causes a problem. In the following, such an example will be described.

Conventionally, such packet loss has been dealt with by retransmission upon timeout in the network layer. However, this processing usually occurs at the time of a fault such as congestion or link breakage, and too frequent occurrence of this processing may give rise to congestion, or a transfer rate may be lowered by awaiting timeout. Thus, from the viewpoint of quality, it is problematic to use the timeout retransmission technique for such a frequent phenomenon as change of a virtual connection in IP switching.

In particular, in the case that IP switching is used in a public network which employs packet metering as an accounting method, the technique of handling packet loss relying on retransmission in the network layer can not be accepted because double accounting on a user may arise.

An object of the present invention is to provide an IP switch, interface circuit and an ATM switch used for that IP switch, and an IP switch network system, which can prevent loss of a frame caused by change of a virtual connection in the middle of frame transfer.

Another object of the present invention is to provide an IP switch, interface circuit and an ATM switch used for that IP switch, and an IP switch network system, which can avoid retransmission owing to the above-described frame loss caused by change of a virtual connection in the middle of frame transfer, and can avoid double accounting on a user due to retransmission of a packet.

Another object of the present invention is to provide an IP switch, interface circuit and an ATM switch used for that IP switch, and an IP switch network system, which can avoid retransmission owing to the above-described frame loss caused by change of a virtual connection in the middle of frame transfer, and can improve the transfer rate.

In a first invention, when a virtual connection is to be changed, a PT (Payload Type) field of an ATM cell which is currently in the course of transfer is referred to, and the transfer line is kept from being changed until the boundary of the frame is recognized, so that an AAL (ATM Adaptation Layer) frame is protected and packet loss is prevented.

In a second invention, when a virtual connection is to be changed, the multicast function of the ATM switch is employed to transfer a sufficient number of cells for transmission of the maximum length of packets through both transfer lines before and after the change, and thereafter the virtual connection before the change is eliminated, so that an AAL5 (ATM Adaptation Layer Type 5) frame is protected and packet loss is prevented. The "sufficient number of cells for transmission of the maximum length of packets" is set in advance, based on the design policy of the network.

In a third invention, when a virtual connection is to be changed, the multicast function of the ATM switch is employed to transfer cells through both transfer lines before and after the change, for a sufficient period of time for transmission of the maximum length of packets, and thereafter the virtual connection before the change is eliminated, so that an AAL5 frame is protected and packet loss is prevented. The "sufficient period of time for transmission of the maximum length of packets" is set in advance, based on design policy of the network.

DESCRIPTION OF THE PREFERRED EMBODIMENTS

Figure 1:
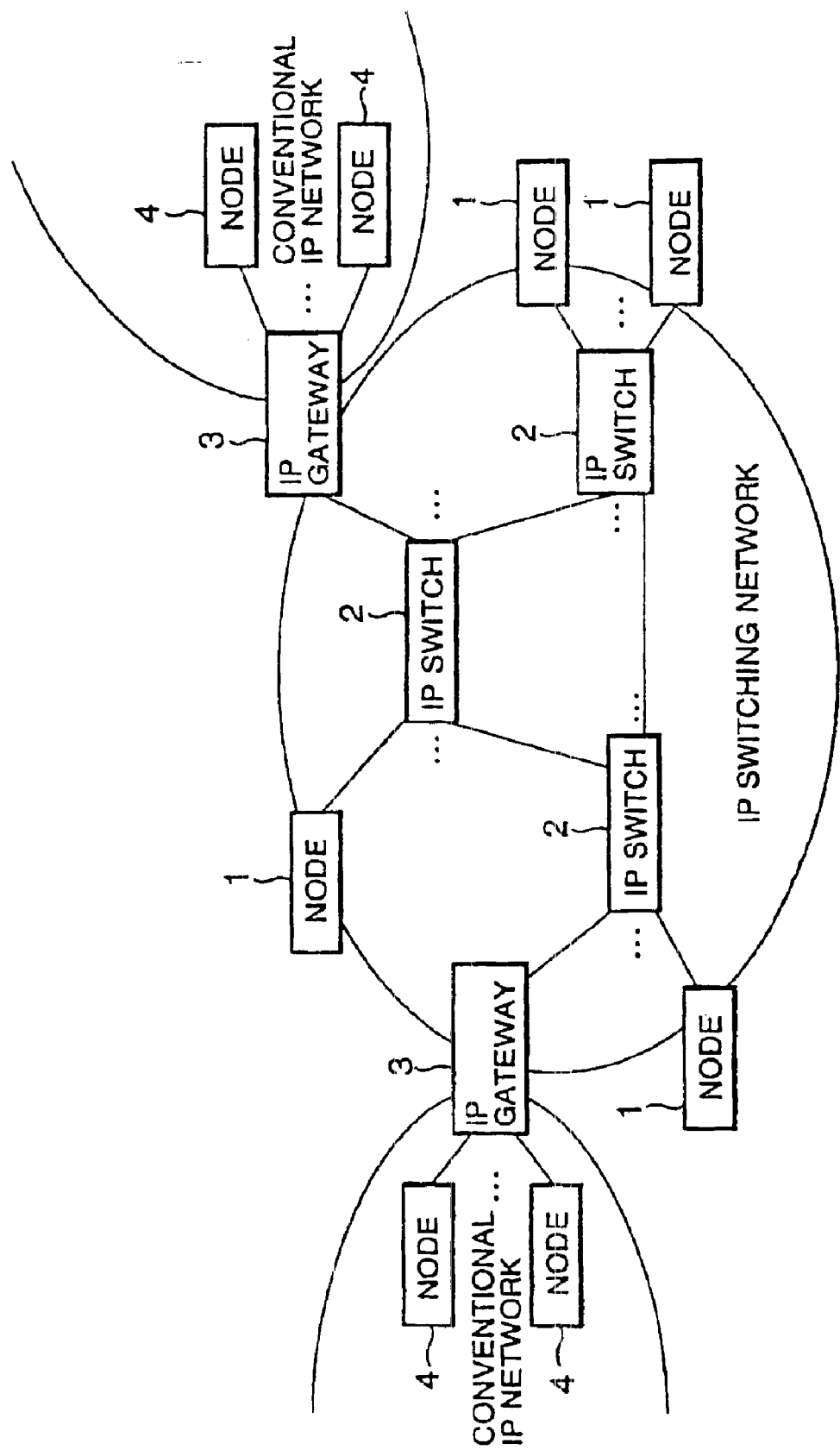
FIG. 1 is a view showing an example of a network to which IP switching is applied.

FIG. 1 is a view showing an example of a network to which IP switching is applied. The network comprises nodes connected by communication media. The nodes include IP switches, edge nodes of the IP switching network (terminals or IP gateways), non-IP switching nodes (terminals or IP routers), and the like. An IP switch is a router employing the IP switching technique, and is connected with other IP switches and edge nodes of the IP switching network so as to form the network. Among the edge nodes of the IP switching network, one situated at the border with a non-IP switching network to communicate therewith is called an IP switch (IP gateway).

Figure 2:
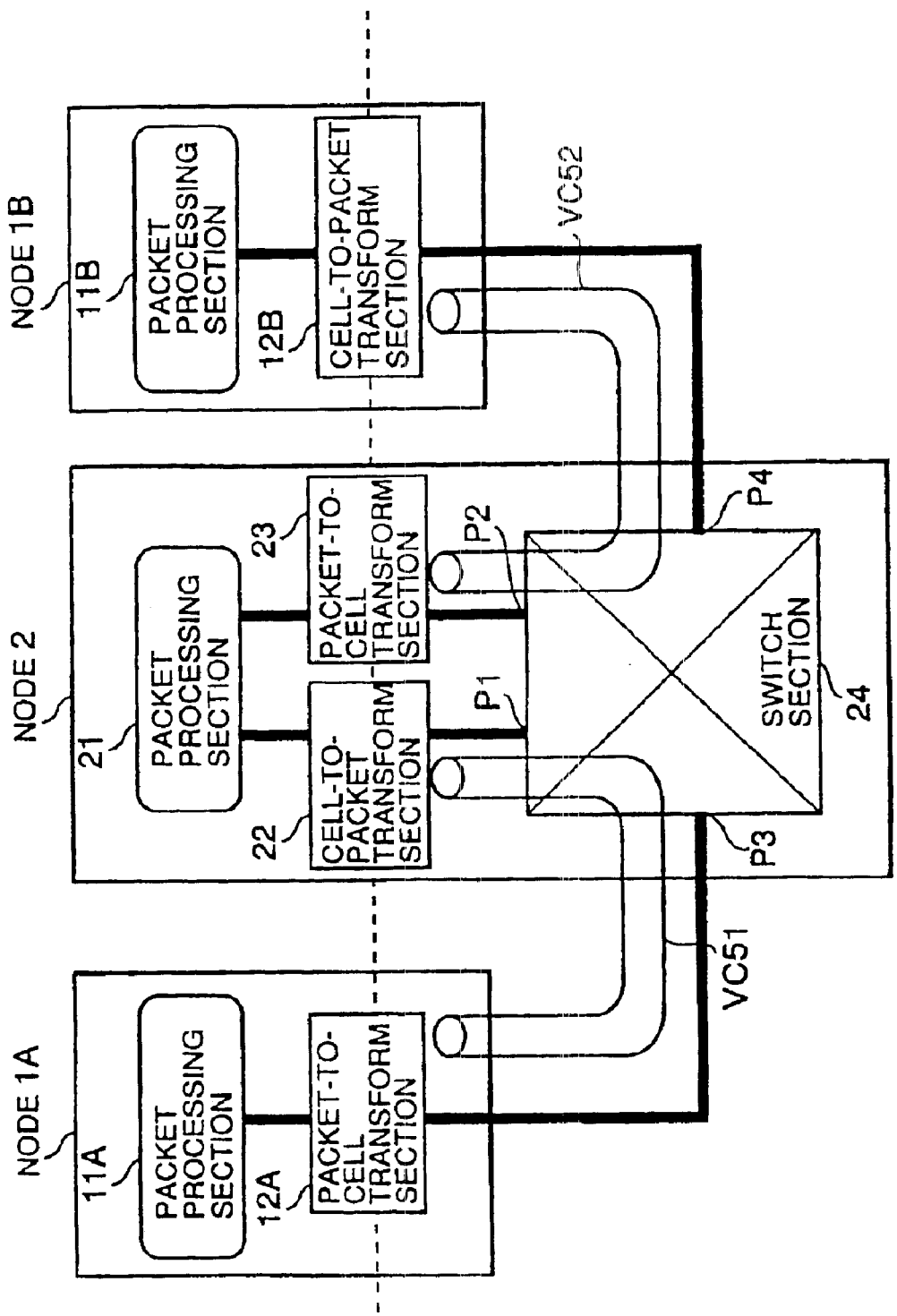
FIG. 2 is a view showing the simplest construction of the IP switching network and internal structures of nodes.

Next, the principle of the IP switching will be described. FIG. 2 shows the simplest construction of the IP switching network. The node 1A and the node 1B are edge nodes of the IP switching network, and are connected with each other through the node 2 which is an IP switch. The node 1A is a sending node, and comprises a packet processing section 11A which performs transfer processing on the IP level, and a packet-to-cell disassembly section 12A which disassembles a packet into ATM cells and performs transfer processing in ATM. The node 1B is a receiving node, and comprises a packet processing section 11B which performs transfer processing on the IP level, and a cell-to-packet assembly section 12B which assembles cells received in ATM to restore them to a packet. The node 2, which is an IP switch, comprises a packet processing section 21 which performs transfer processing on the IP level, a cell-to-packet assembly section 22 which assembles cells received in ATM to restore them to a packet, a packet-to-cell disassembly section 23 which disassembles a packet to ATM cells to transfer them in ATM, and a switch section 24 which performs switching on the ATM level. The switch section 24 has ports P1–P4, which are connected to the cell-to-packet assembly section 22, the packet-to-cell disassembly section 23, the node 1A, and the node 1B, respectively. A virtual connection VC51 is established in advance between the node 1A and the node 2, and a virtual connection VC52 is established in advance between the node 2 and the node 1B. These virtual connections are prepared for ordinary data transfer and control message transfer.

Here, for the sake of simplicity, the node 1A is described as having the packet-to-cell disassembly section only, and the node 1B the cell-to-packet assembly section only. In fact, communication is performed bilaterally, and each node has both the packet-to-cell disassembly section and the cell-to-packet assembly section. Further, here, the packet-to-cell disassembly section and the cell-to-packet assembly section are described as separate functional blocks. However, it is possible for both sections to be implemented in one functional block. In that case, the ports P1 and P2 are reduced to one port.

Figure 3:
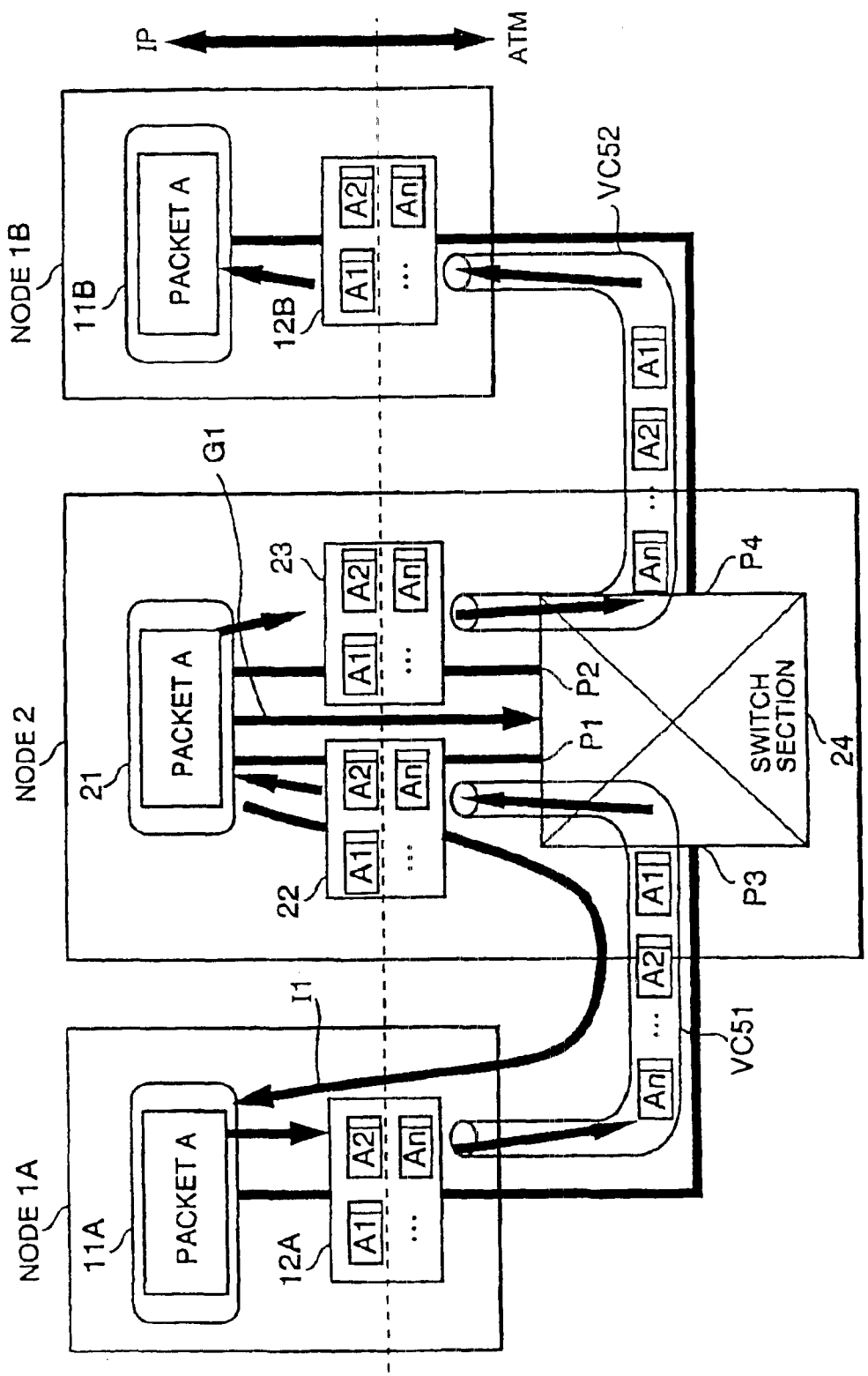
FIG. 3 is a view showing how a packet is transferred in a normal state.
Figure 4:
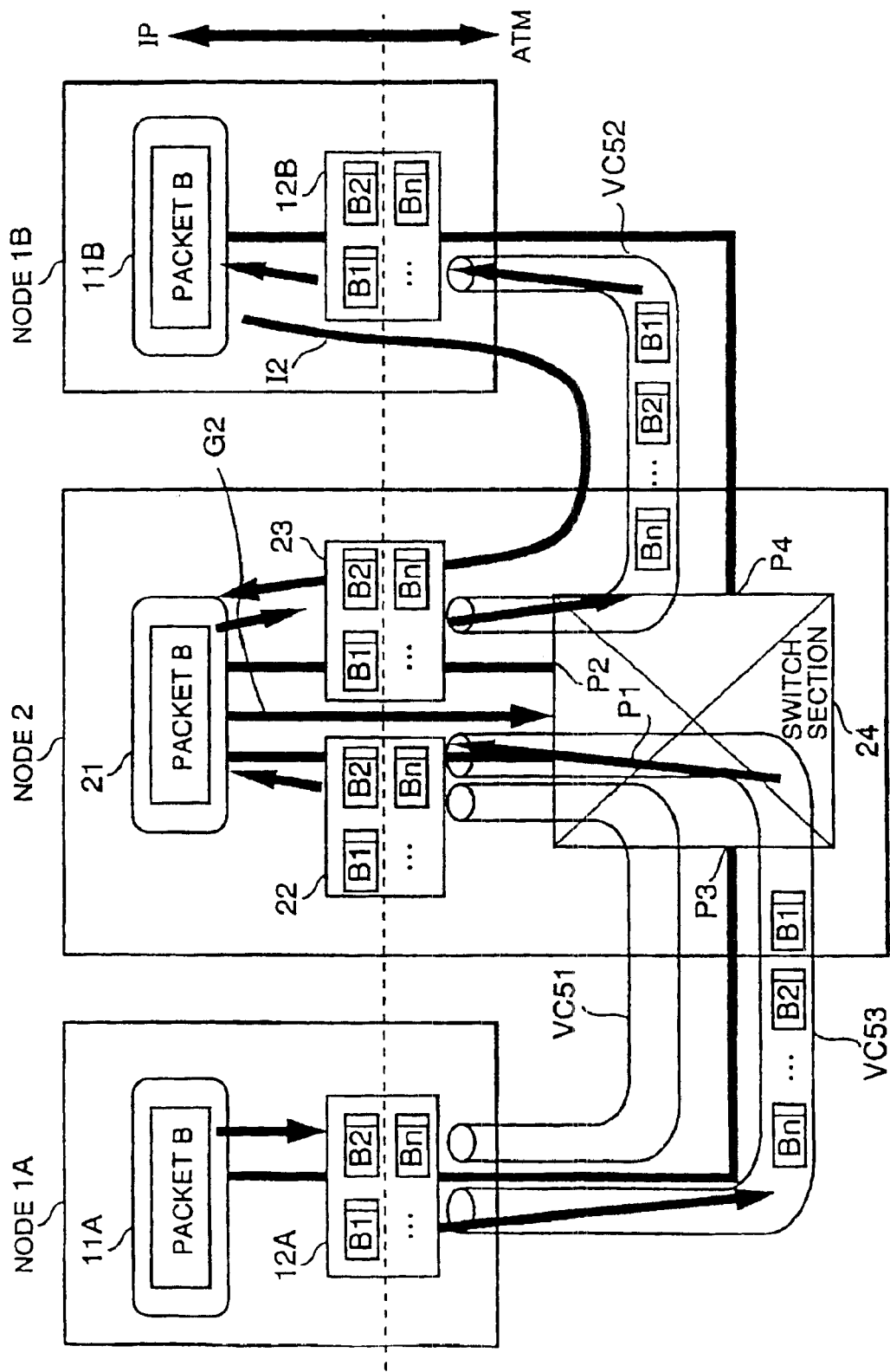
FIG. 4 is a view showing how a packet is transferred using a new virtual connection.
Figure 5:
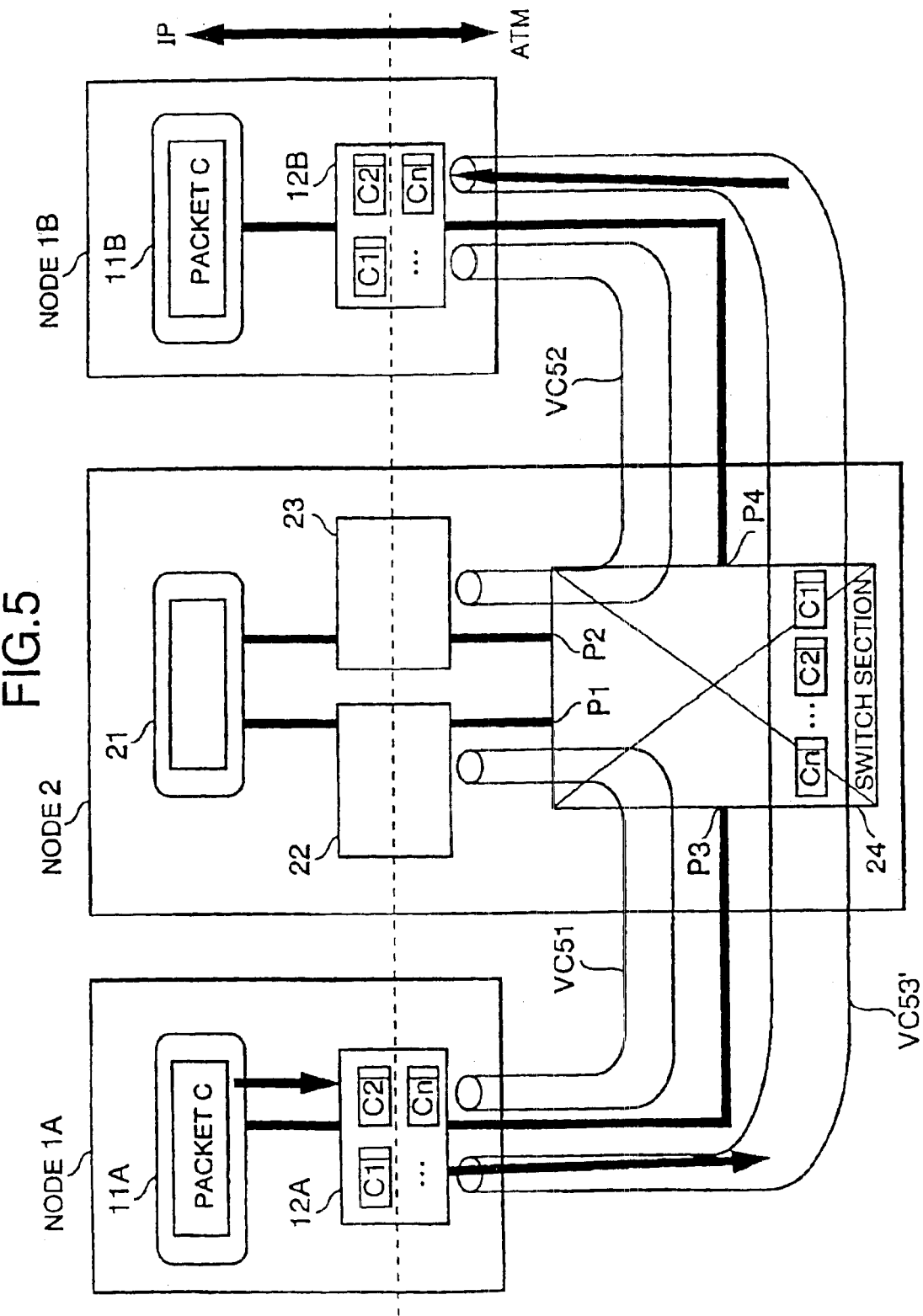
FIG. 5 is a view showing how a packet is transferred using a new virtual connection, when a packet processing in an IP switch is omitted.

FIGS. 3–5 are views explaining the principle of IP switching. These figures illustrate a state where packets A, B and C are sent from the node 1A to the node 1B consecutively.

At first, FIG. 3 is referred to. Here, a packet A is generated in the node 1A. Then, in the first place, the packet processing section 11A judges that the packet A is one destined for the node 1B, decides to transfer the packet toward the node 2, the adjacent node in the direction of the node 1B, and delivers the packet A to the packet-to-cell disassembly section 12A. The packet-to-cell disassembly section 12A disassembles the packet A into ATM cells A1–An, and transfers them through the virtual connection VC51. The switch section 24 receives the ATM cells A1–An, and transfers them to the cell-to-packet assembly section 22. On receiving the ATM cells A1–An, the cell-to-packet assembly section 22 assembles them into the packet A and sends it to the packet processing section 21. The packet processing section 21 judges from the contents of the packet A that the packet A should be sent to the node 1B, and sends it to the packet-to-cell disassembly section 23. The packet-to-cell disassembly section 23 disassembles the packet A into the ATM cells A1–An again, and transfers them to the node 1B through the virtual connection VC52 destined for the node 1B. Last, the cell-to-packet assembly section 12B of the node 1B receives the ATM cells A1–An, assembles them into the packet A, and sends it to the packet processing section 11B, completing the transfer process.

At this time, the packet processing section 21 of the node 2, which has processed the packet A, estimates whether another packet is to be received hereafter consecutively, based on the flow rate of cells sent from the node 1 for a given period of time. When it is estimated that another packet is to be received consecutively, the packet processing section 21 sends a request G1 to the switch section 24 for setting a new virtual connection VC53 as shown in FIG. 4. At the same time, the packet processing section 21 sends a request I1 to the node 1A for sending following packets through the virtual connection VC53. In this example, the request I1 is sent through a control line between the node 1A and node 2. It, however, may be sent through the virtual connection VC51.

Figure 6:
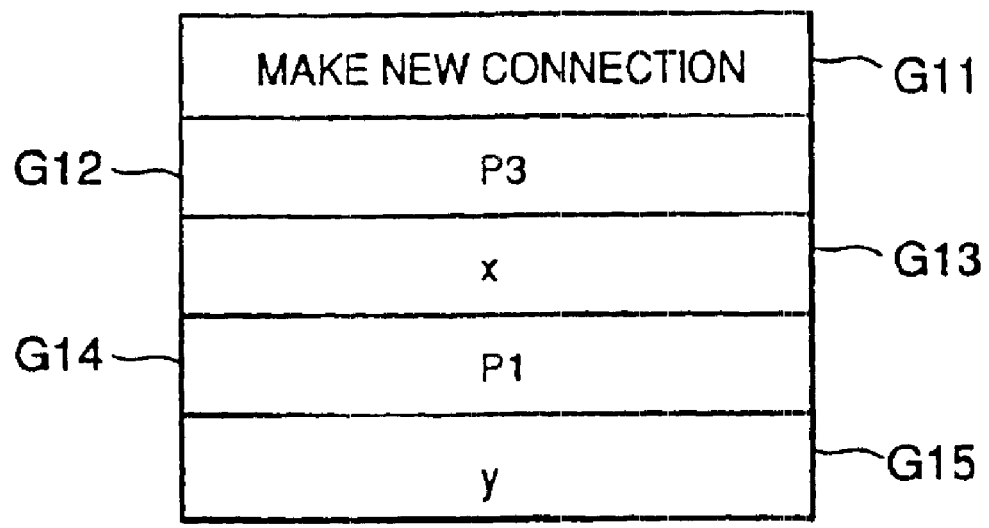
FIG. 6 is a view showing an example of a virtual connection setting request.

FIG. 6 shows an example of the request G1 for setting a new virtual connection from the packet processing section to the switch section 24. The reference symbol G11 refers to a message type (in this case, "Make new connection"), and G12–G15 refer to information elements for setting a virtual connection in the switch section 24. Namely, G12 refers to an input-side port identifier, G13 to an input-side virtual connection identifier x representing the virtual connection VC53 to be set newly, G14 to an output-side port identifier, and G15 to an output-side virtual connection identifier y representing the virtual connection VC53 to be newly set. Thus, the example shown in FIG. 6 represents a request, "Set a new virtual connection VC53 which connects the virtual connection identifier x at the input-side port P3 with the virtual connection identifier y at the output-side port P1".

Next, FIG. 4 will be referred to. In FIG. 4, a packet B generated in the node 1A is transferred to the node 1B as in FIG. 3. The difference from FIG. 3 lies in that the ATM transfer from the node 1A to the node 2 is performed through the virtual connection VC53.

In parallel with this, similarly to the node 2 in FIG. 3, the node 1B estimates from the former packet A that another packet is to be received consecutively hereafter, and sends the node 2 a request I12 for a new virtual connection for transmission. On receiving the request, instead of making a new virtual connection, the node 2 sends a virtual connection change request G2 to the switch section 24 for making a virtual connection between the node 1B and the node 2 corresponding to the virtual connection VC53. As a result, the virtual connection VC53 is changed to a virtual connection VC53' shown in FIG. 5.

Figure 7:
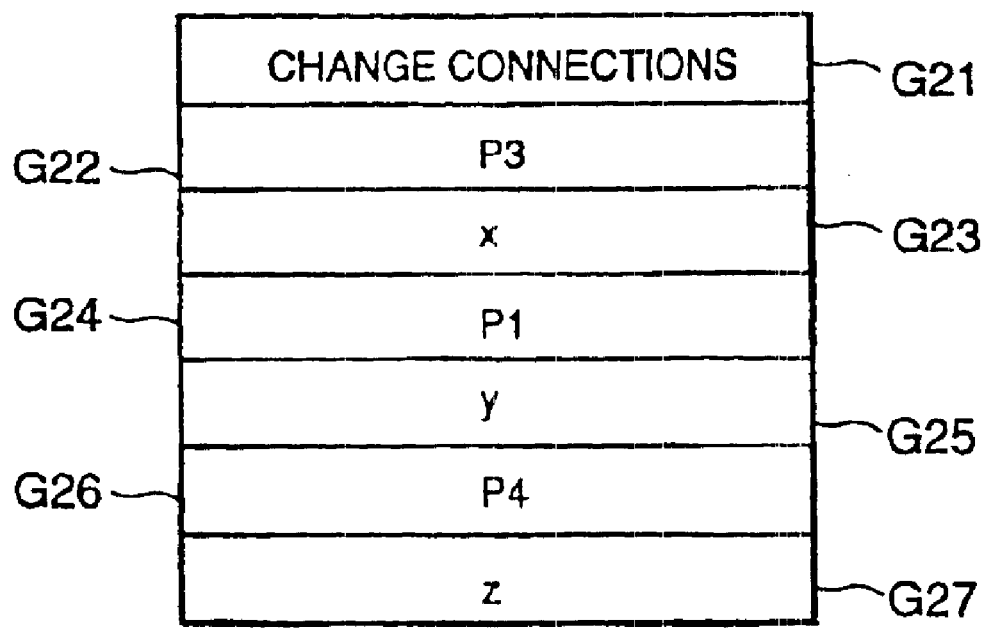
FIG. 7 is a view showing an example of a virtual connection change request.

FIG. 7 shows an example of the virtual connection change request G2 sent from the packet processing section 21 to the switch section 24. Similarly to G1, G21 refers to a message type (in this case, "change connections"), and G22–G27 refer to information elements for setting a virtual connection in the switch section 24. Namely, G22 refers to an input-side port identifier, G23 to an input-side virtual connection identifier x representing the virtual connection VC53' to be set newly, G24 to an output-side port identifier before change, G25 to an output-side virtual connection identifier y before change, G26 to an output-side port identifier after change, and G27 to an output-side virtual connection identifier z after change representing the virtual connection VC53' to be newly set. From G22–G25, the switch section 24 judges which virtual connection is requested, and replaces only the output-side setting with the information in G26 and G27.

Thus, the example shown in FIG. 7 represents a request, "Change the virtual connection VC53, which is represented by the input-side port P3—virtual connection identifier x, and the output-side port P1—virtual connection identifier y, to the virtual connection VC53' which is represented by the input-side port P3—virtual connection identifier x, and the output-side port P4—virtual connection identifier z".

Last, FIG. 5 will be referred to. As shown in FIG. 5, a packet C is transferred from the node 1A to the node 1B through the virtual connection VC53' established by the above process. Here, in the node 2, the packet processing in the network layer handled by software is dispensed with, and only hardware processing in the ATM layer is performed, and accordingly the packet can be transferred at higher speed.

Figure 8:
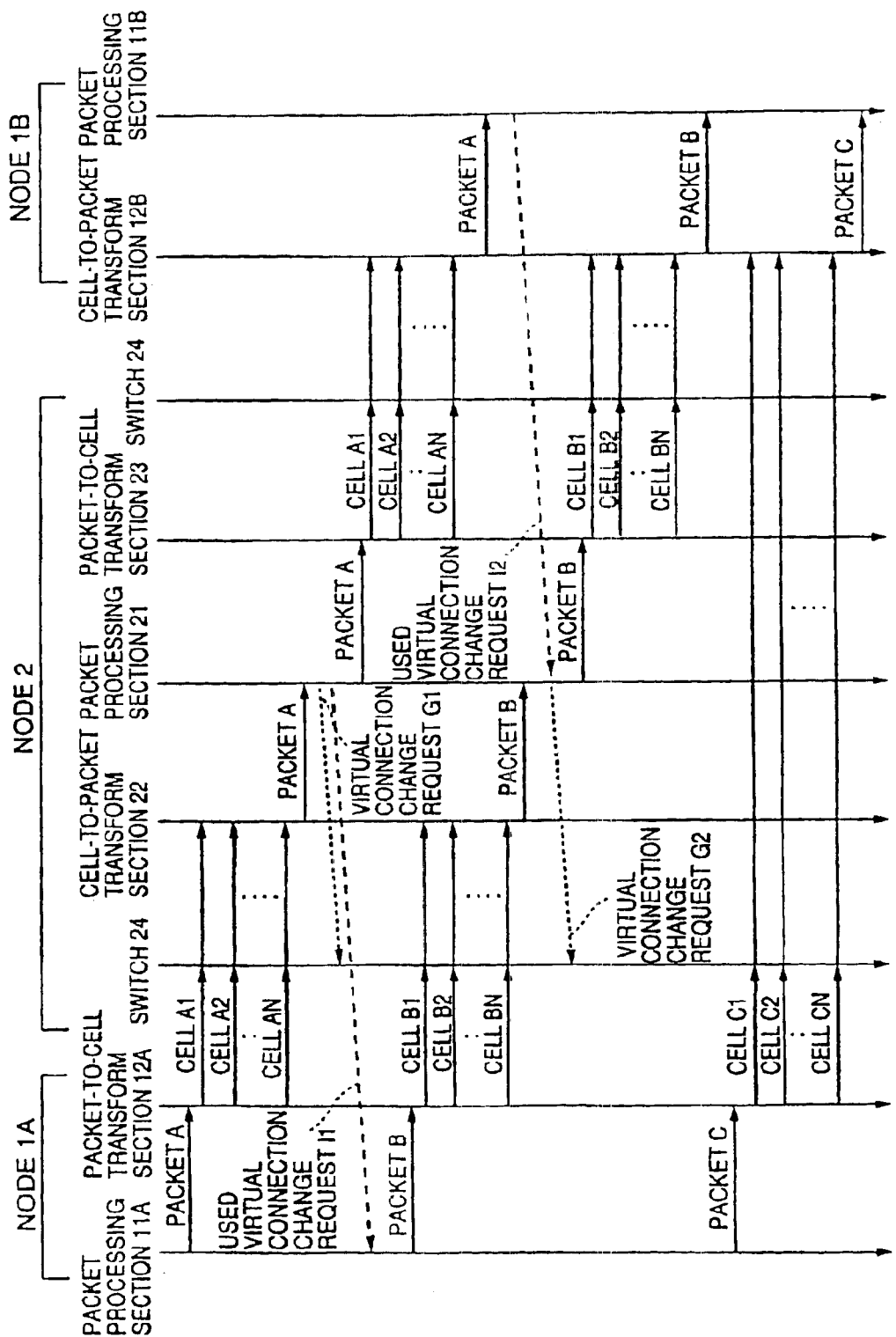
FIG. 8 is a sequence diagram showing how information is interchanged in FIGS. 4 and 5.

FIG. 8 is a sequence diagram showing how the information in FIGS. 3, 4 and 5 is interchanged. As shown in FIG. 8, the packet processing section 21 sends the switch section 24 the virtual connection change request G2. In fact, since the switch section 24 and the packet processing section 21 are not synchronized, there may arise a case that, during the processing in the switch section 24, a virtual connection change request related to an already-processed packet arrives from the packet processing section 21.

Figure 10:
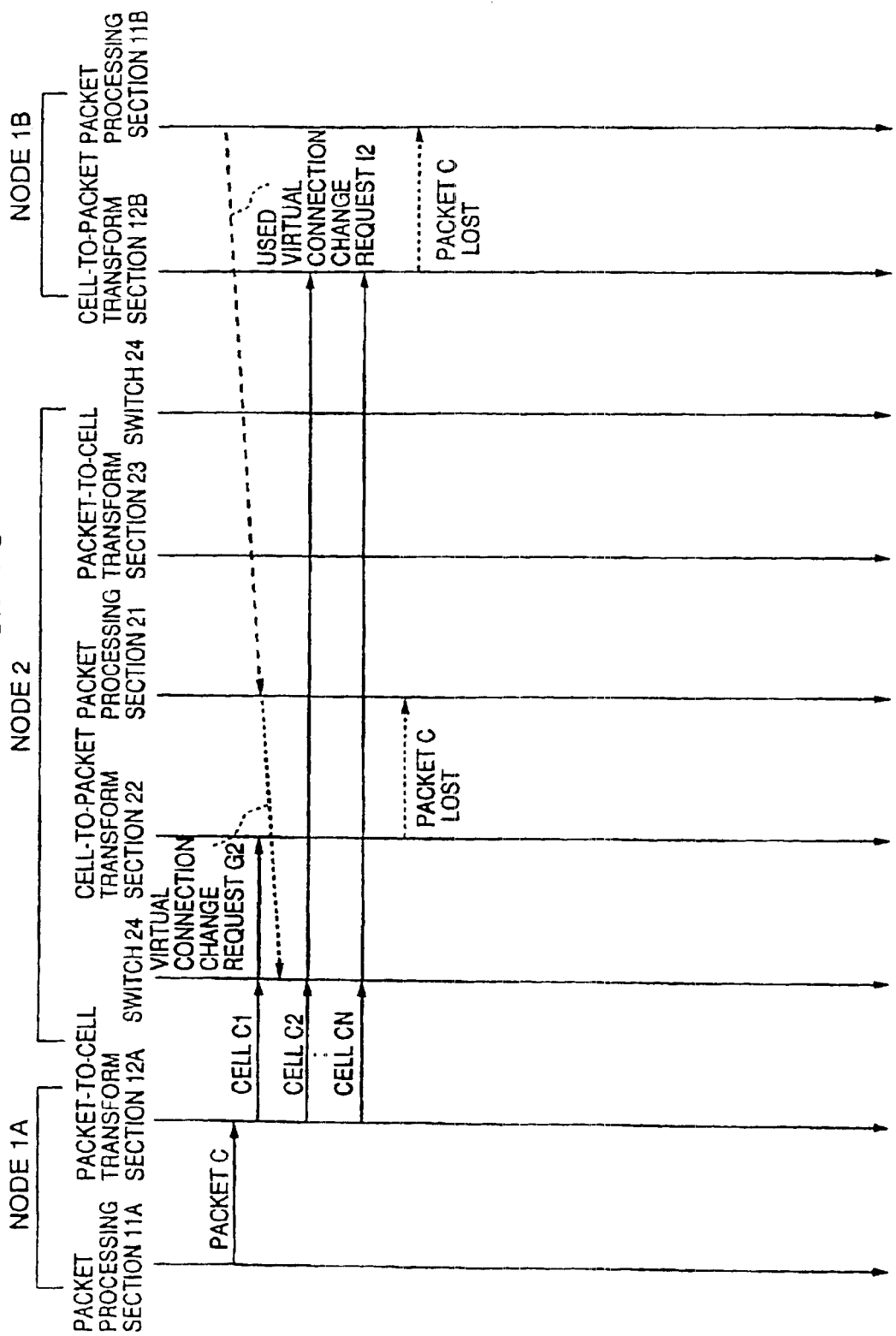
FIG. 10 is a sequence diagram showing an example where a packet is lost owing to a virtual connection change request.

For example, a sequence diagram of FIG. 10 shows an example where, while the switch section 24 is processing the cell string C1–Cn which is obtained by disassembling the packet C, the switch section 24 receives a virtual connection change request G2 from the packet processing section 21. Here, in FIG. 10, after the switch section 24 has completed processing of the cell C1 disassembled from the packet C, the virtual connection request G2 arrives at the switch section 24 from the packet processing section 21. As a result, the virtual connection VC53 which has been destined for the cell-to-packet transform section 22 of the node 2 is changed to one destined for the cell-to-packet transform section 12B of the node 1B. As a result the cell C1 arrives at the cell-to-packet transform section 22 of the node 2, and the cells C2–Cn arrive at the cell-to-packet transform section 12B of the node 1B. In each of the cell-to-packet transform sections 22 and 12B, the set of cells is not complete, and is discarded in that section. As a result, this packet C is lost on the network, and communication between the node 1A and the node 1B is not performed normally.

Figure 9:
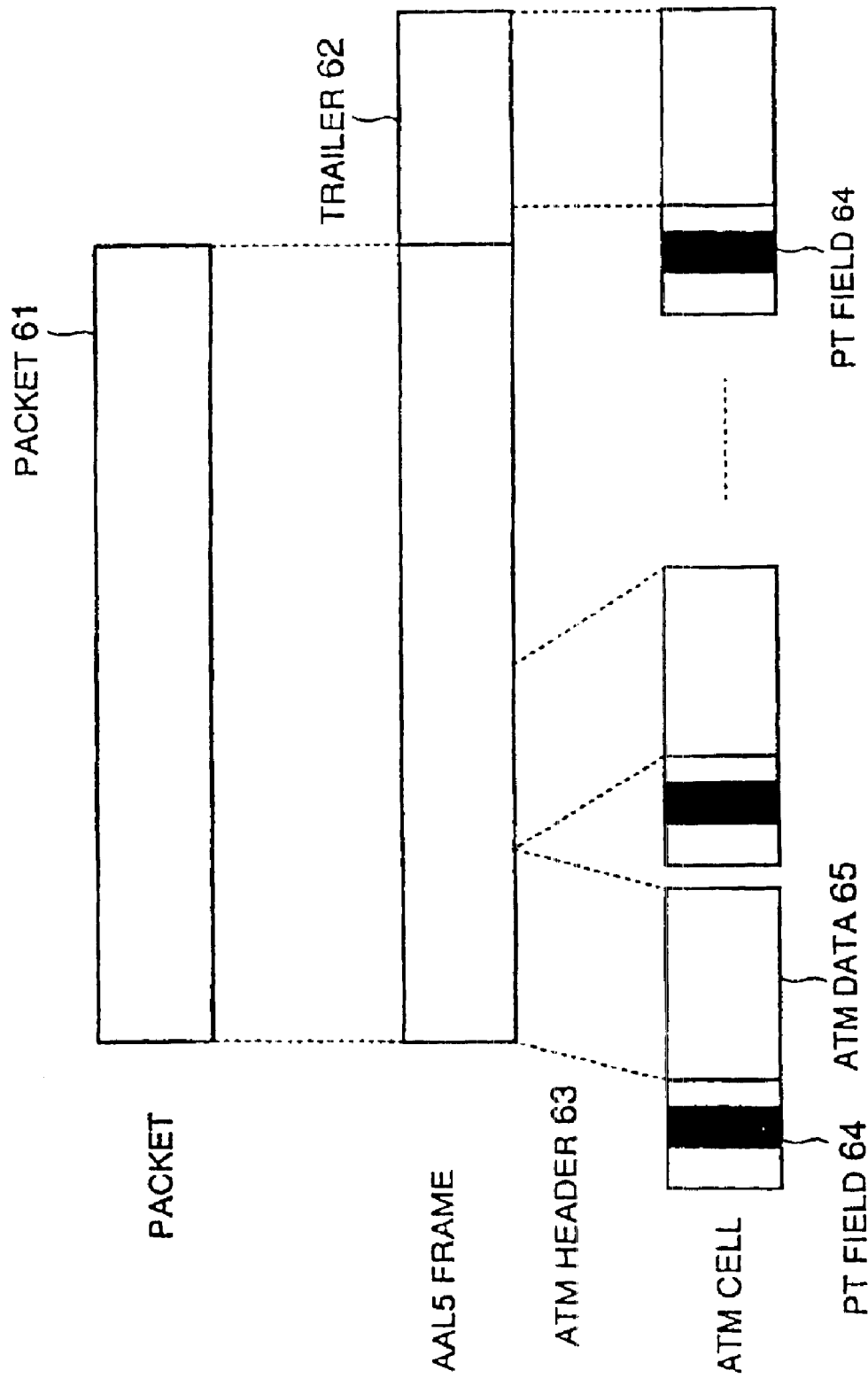
FIG. 9 is a view showing correspondence relations among a packet, an AAL5 frame and ATM cells.

As a system for packet communication in ATM, a system called AAL5 (ATM Adaptation Layer Type 5) is generally used, and IP switching also employs this system. Procedures in this system will be described referring to FIG. 9.

First, on a sending side, a trailer 62 is added to a packet 61 in the network layer to obtain an AAL5 frame. The obtained AAL5 frame is disassembled into pieces of ATM data 65. Each piece of the ATM data 65 is provided with an ATM header 63 to be an ATM cell, which is sent onto a virtual connection in ATM. An ATM header contains a part called a PT (Payload Type) field 64. For an ATM header 63 of a cell located at the end of an AAL5 frame, a value "1" is set to its PT field 64, and for the other cells, a value "0" is set to their respective PT fields 64, thus indicating a boundary of the frame. On a receiving side, a cell with the value "1" in the PT field 64 is detected to separate a string of cells, and the trailers 62 are checked to confirm that the frame is not broken. Then, after removing the trailers 62, the frame is delivered in the form of the packet 61 to the network layer.

Figure 11:
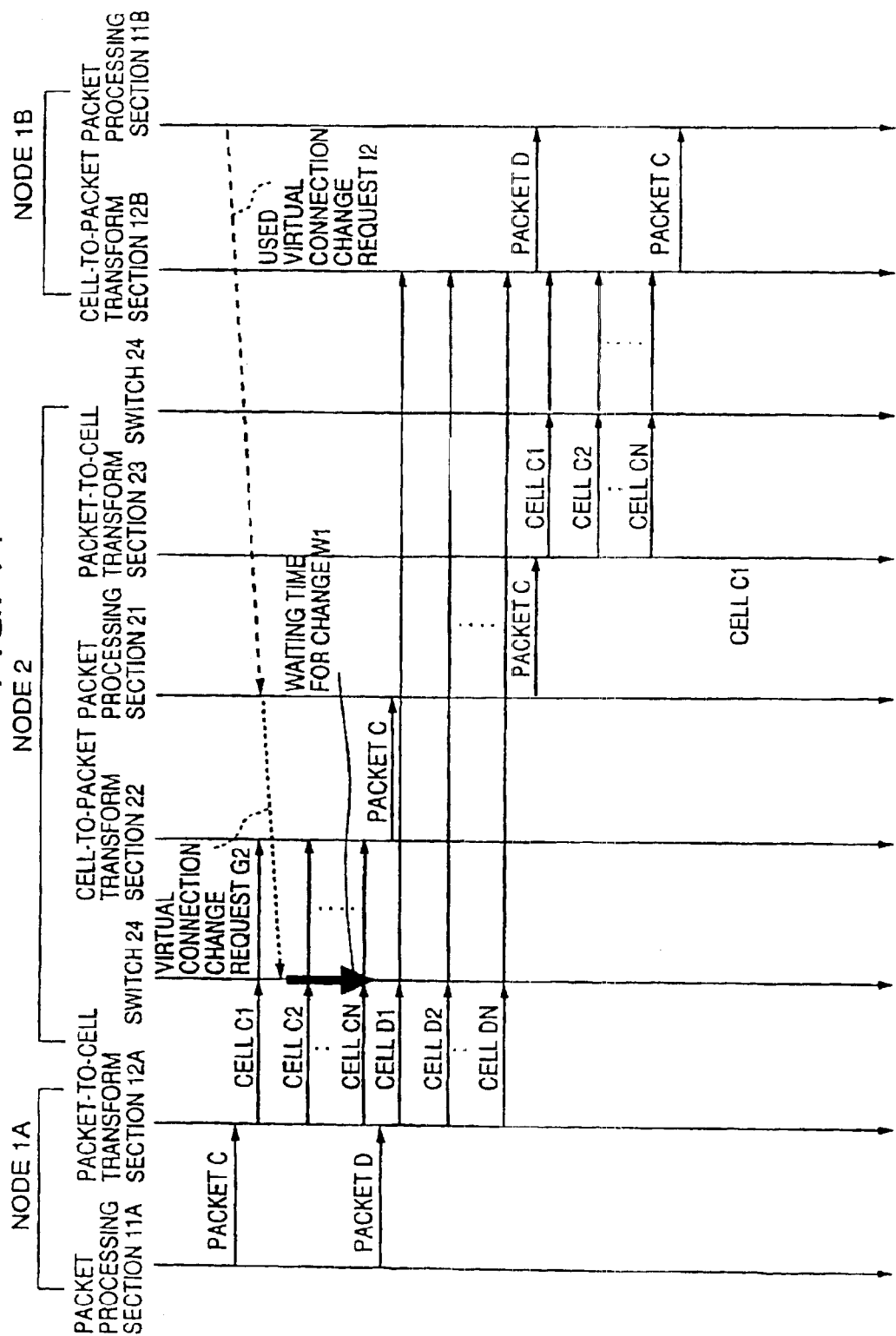
FIG. 11 is a sequence diagram in the case where a waiting time for a change of virtual connections is set.

FIG. 11 is a sequence diagram showing basic operation of the present invention. Similarly to FIG. 10, here also, a virtual connection change request G2 arrives after C1 has been processed. As shown in FIG. 11 by a waiting time W1 for a change, the switch section 24 awaits arrival of the cell Cn having the PT field value "1" before changing the virtual connection VC53. This waiting time W1 is set as a sufficient period of time for sending the largest packet allowed by the network. Various values may be set to W1 depending on the design policy of the network. As a result, no packet is lost in the communication between the node 1A and the node 1B, and communication is performed normally. In this FIG. 11, although the order of the packet C and a packet D is reversed, it can be restored by processing in the network layer. Differently from the loss, it is not necessary to await timeout, and hardly any quality problem arises.

Figure 14:
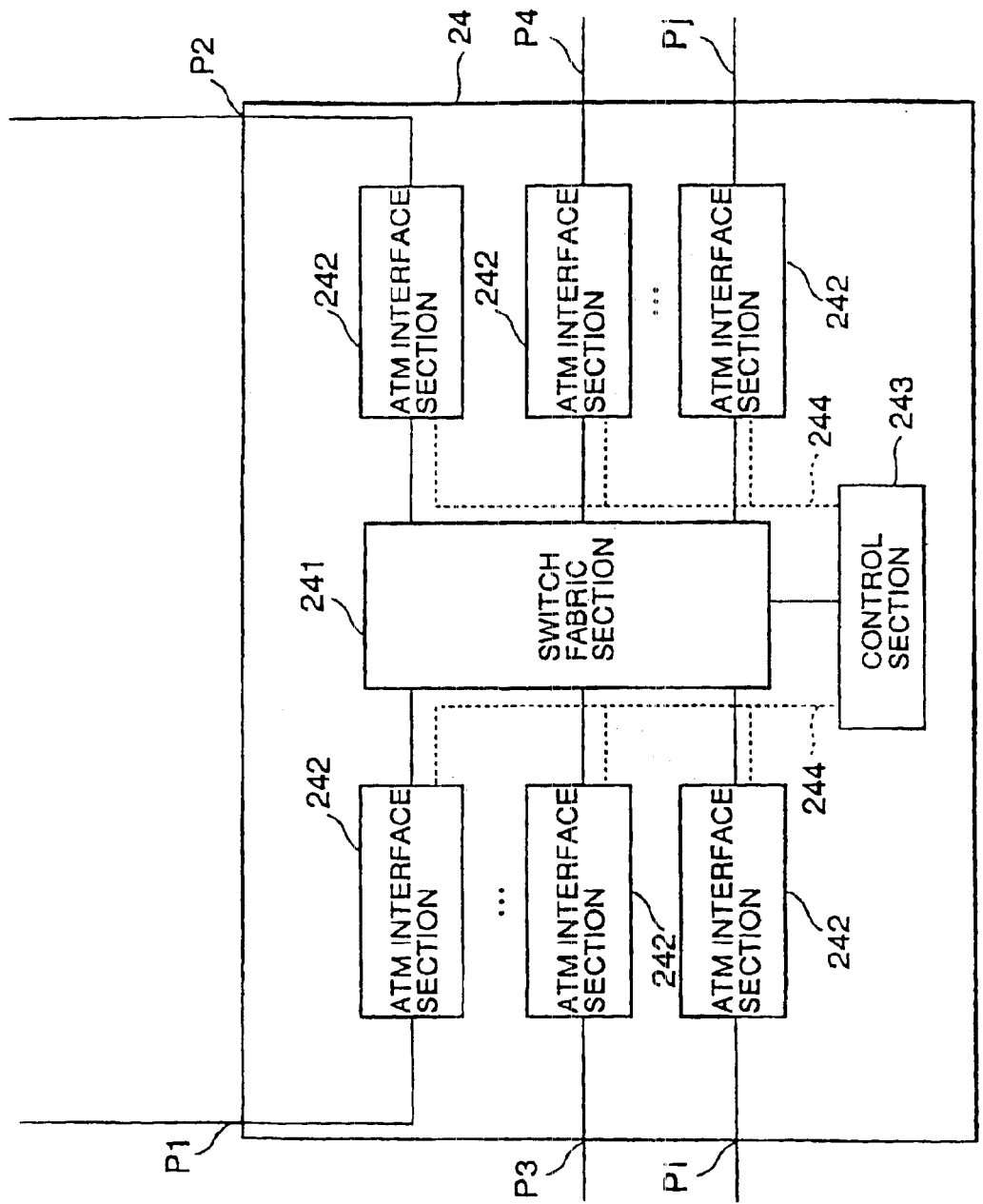
FIG. 14 is a view showing a basic internal structure of a switch section 24.

FIG. 14 shows an internal structure of the switch section 24. A cell from the outside is received at an ATM interface section 242 on an input side, its header is exchanged, and thereafter, the cell is directed by a switch fabric section 241 toward an objective direction, and outputted through an ATM interface section 242 on an output side. A switch control instruction from the packet processing section 21 is temporarily sent to a switch control section 243 through an ATM interface section 242. In the switch control section 243, the switch control instruction is transformed into an interface control instruction, and sent to an ATM interface section 242 through an internal line 244, to be processed.

Figure 15:
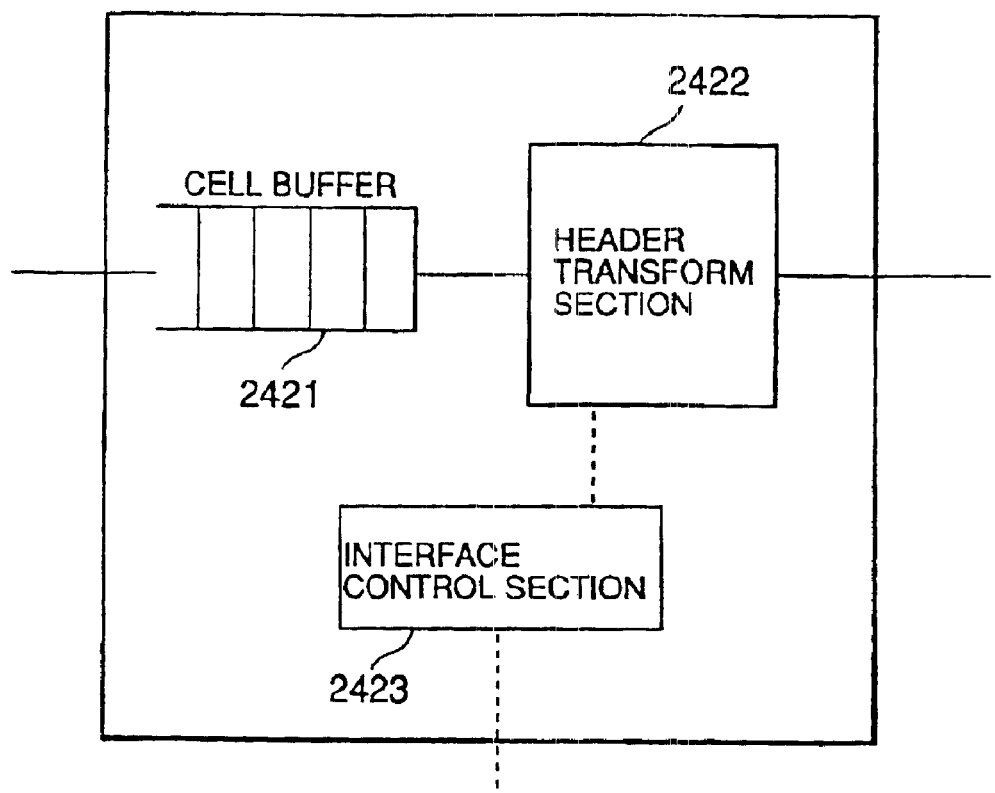
FIG. 15 is a view showing a basic internal structure of an ATM interface section 242.

FIG. 15 shows the structure of an ATM interface section 242. A cell inputted into the ATM interface section 242, is temporarily stored in a cell buffer 2421, and transformed in a header transform section 2422, and sent to a switch fabric section 2423. The interface control instruction from the switch control section 243 is received by an interface control section 241 and executed there.

Figure 16:
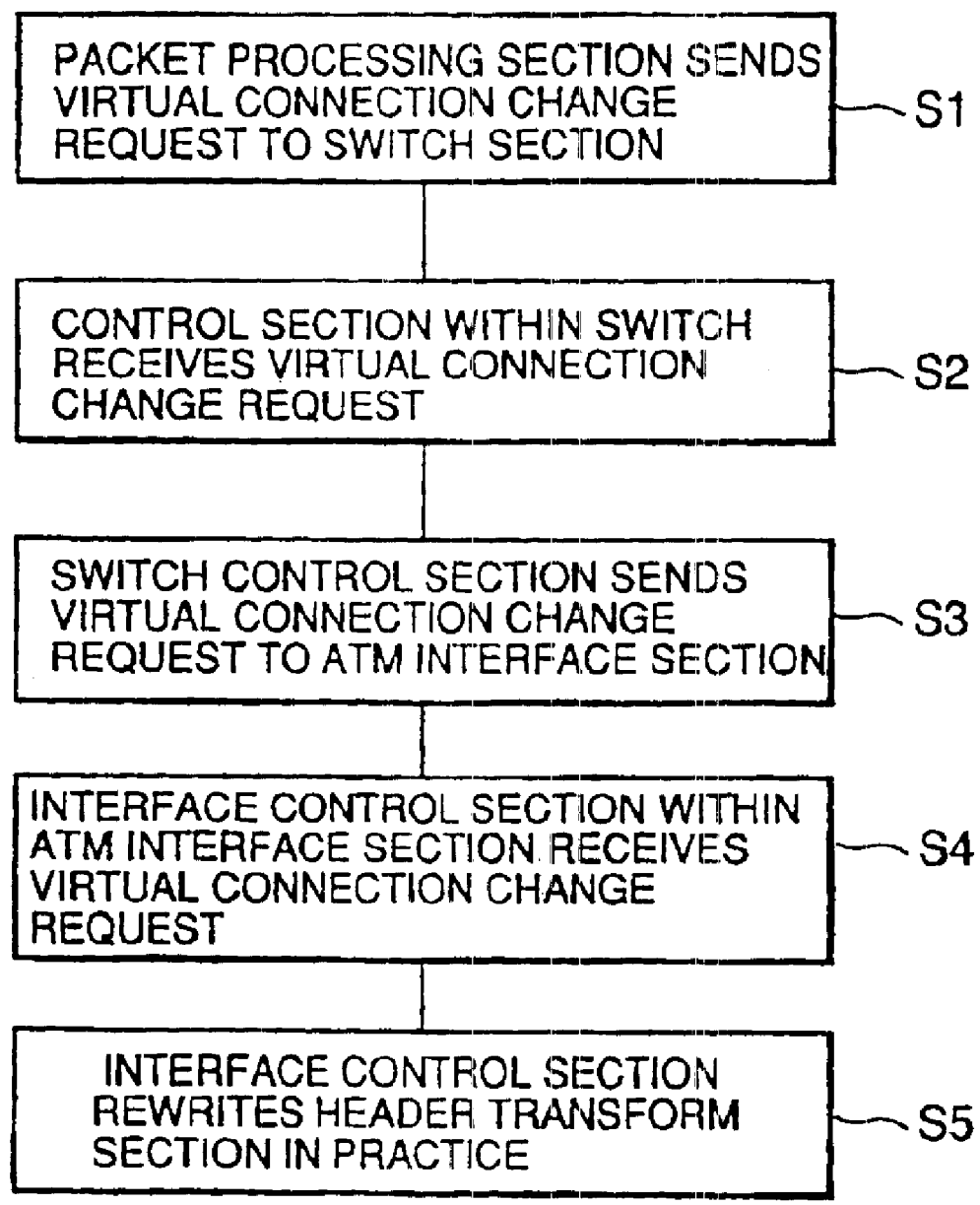
FIG. 16 is a flowchart showing a virtual connection change procedure.

FIG. 16 is a flowchart showing an example of a procedure for changing virtual connections. First, when the packet processing section 21 judges that a change of switch setting is necessary, the packet processing section 21 sends a virtual connection change request to switch section 24 (Step S1). This request is received by the switch control section 243 within the switch section 24 (Step S2), and the switch control section 243 transforms the request into an interface control instruction and sends it to the interface section 242 (Step S3). The interface control instruction is received by the interface control section 2423 within the ATM interface section 242 (Step S4), and the interface control section 2423 rewrites a table in the header transform section 2422 (Step S5), completing the change of the virtual connections.

Figure 19:
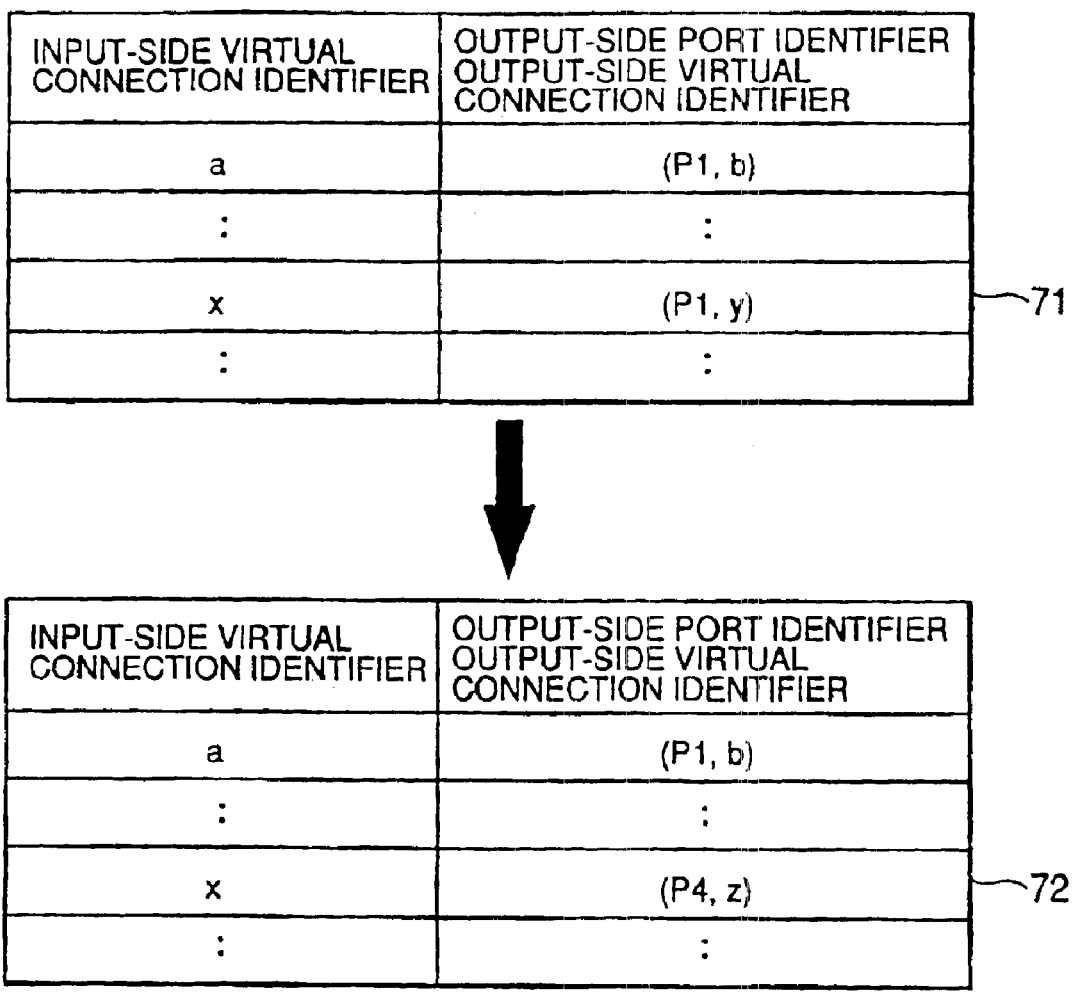
FIG. 19 is a view showing an example of rewriting an output-side port identifier, using a header transform table.

FIG. 19 shows an example of rewriting a header transform table. This is an example of a header transform table for the port P3, including pairs of an input-side virtual connection identifier and output-side port identifier—virtual connection identifier. In FIG. 19, entries 71 and 72 correspond to the change from the virtual connection VC53 to the virtual connection VC53' in FIGS. 4, 5, and 7. Namely, the entry 71 represents the virtual connection VC53, and the entry 72 the virtual connection VC53'.

Figure 17:
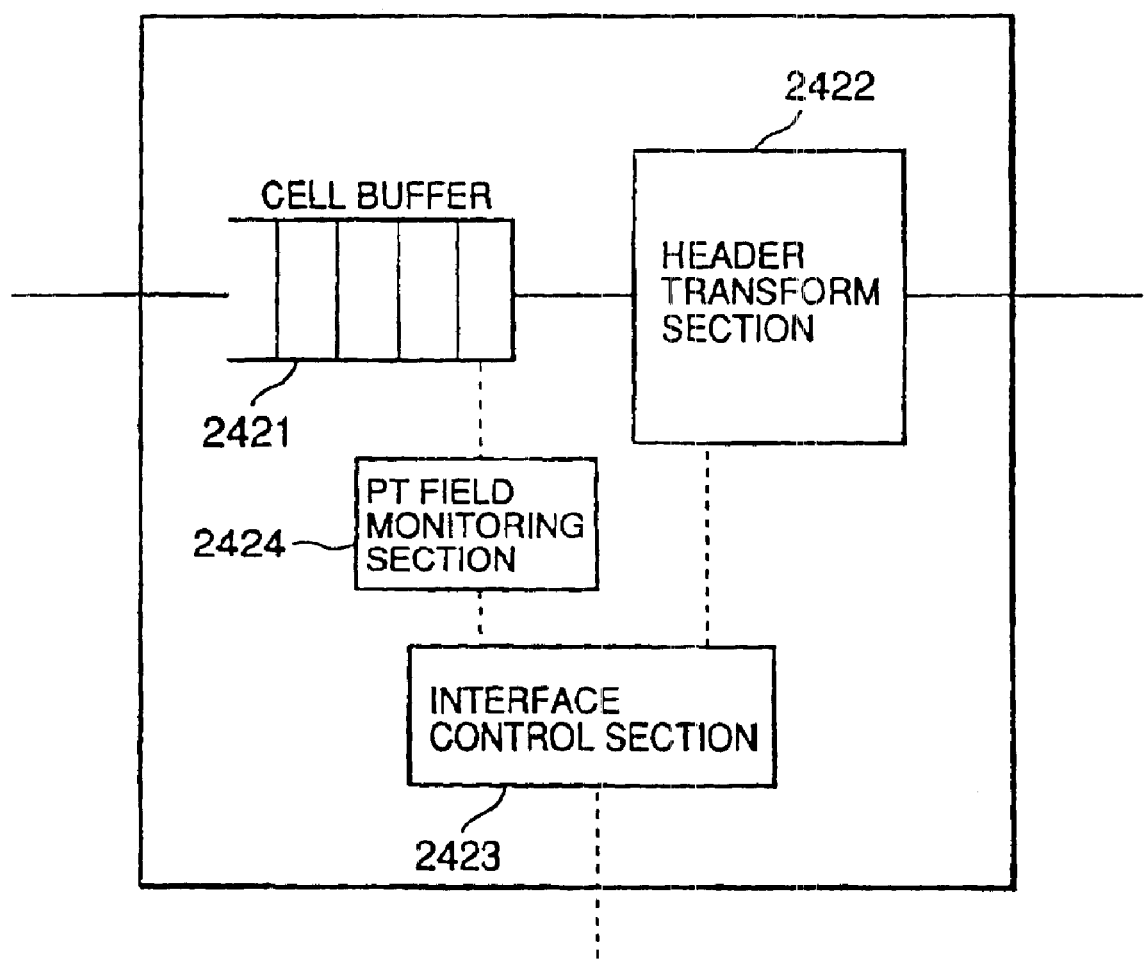
FIG. 17 is a view showing an internal structure of the ATM interface section 242 provided with a PT field monitoring section.

FIG. 17 illustrates an internal structure of the ATM interface section 242 on the input side, according to the present invention. In comparison with FIG. 15, a PT field monitoring section 2424 is newly added.

Figure 18:
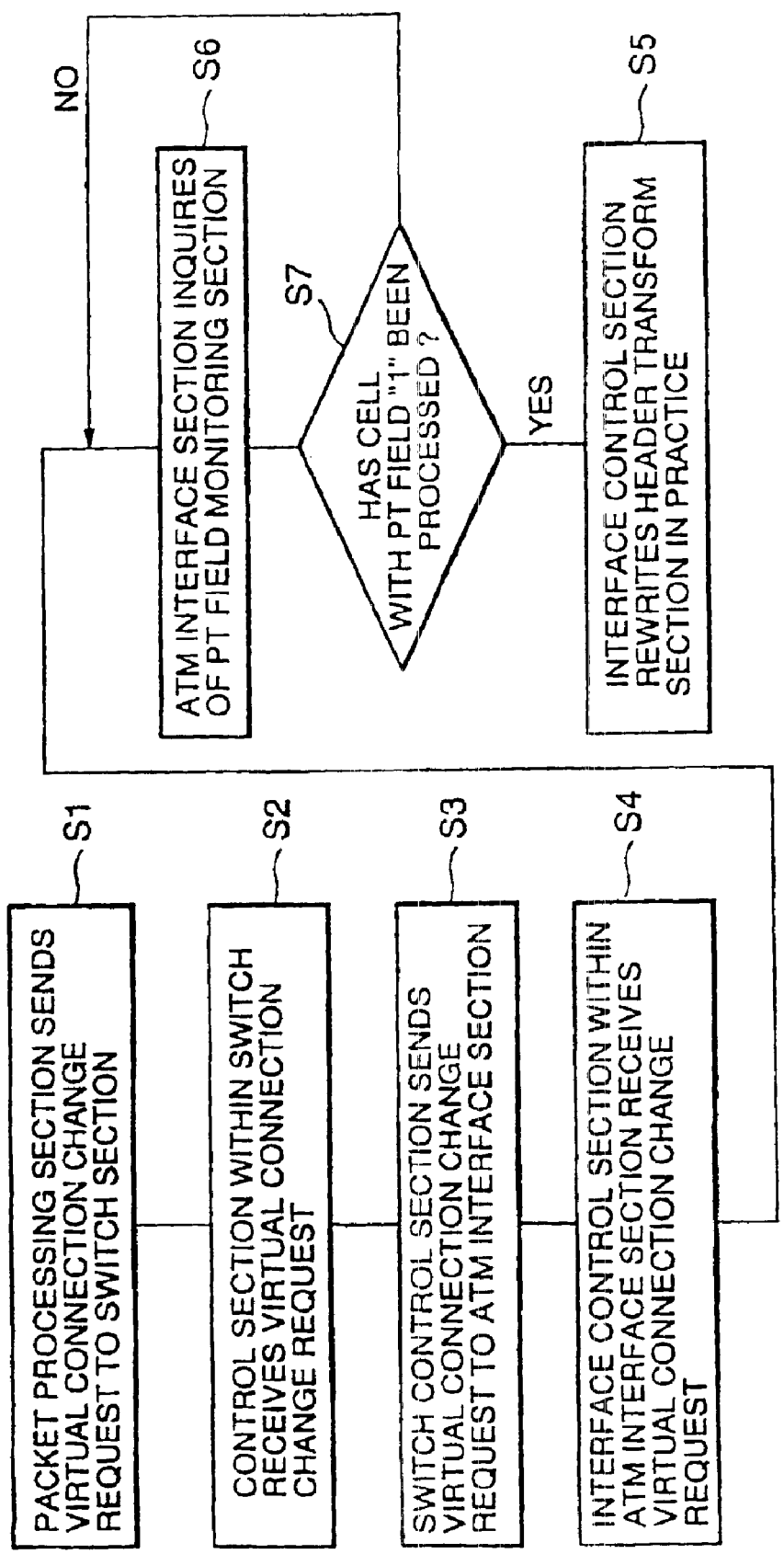
FIG. 18 is a flowchart showing a virtual connection change procedure which includes monitoring of a PT field.

FIG. 18 is a flowchart showing an example of a procedure for changing virtual connections using the PT field monitoring section. Between the step S4 and the Step S5 of FIG. 16, Step S6 and Step S7 are inserted. In Step 6, the ATM interface control section 2423 asks the PT field monitoring section 2424 if a cell with PT field value "1" has been processed. In Step 7, based on the response from the PT field monitoring section 2424, the interface control section 2423 judges if to proceed to Step 5.

Rewriting of the header transform table performed in Step 5 is similar to FIG. 19.

Figure 27:
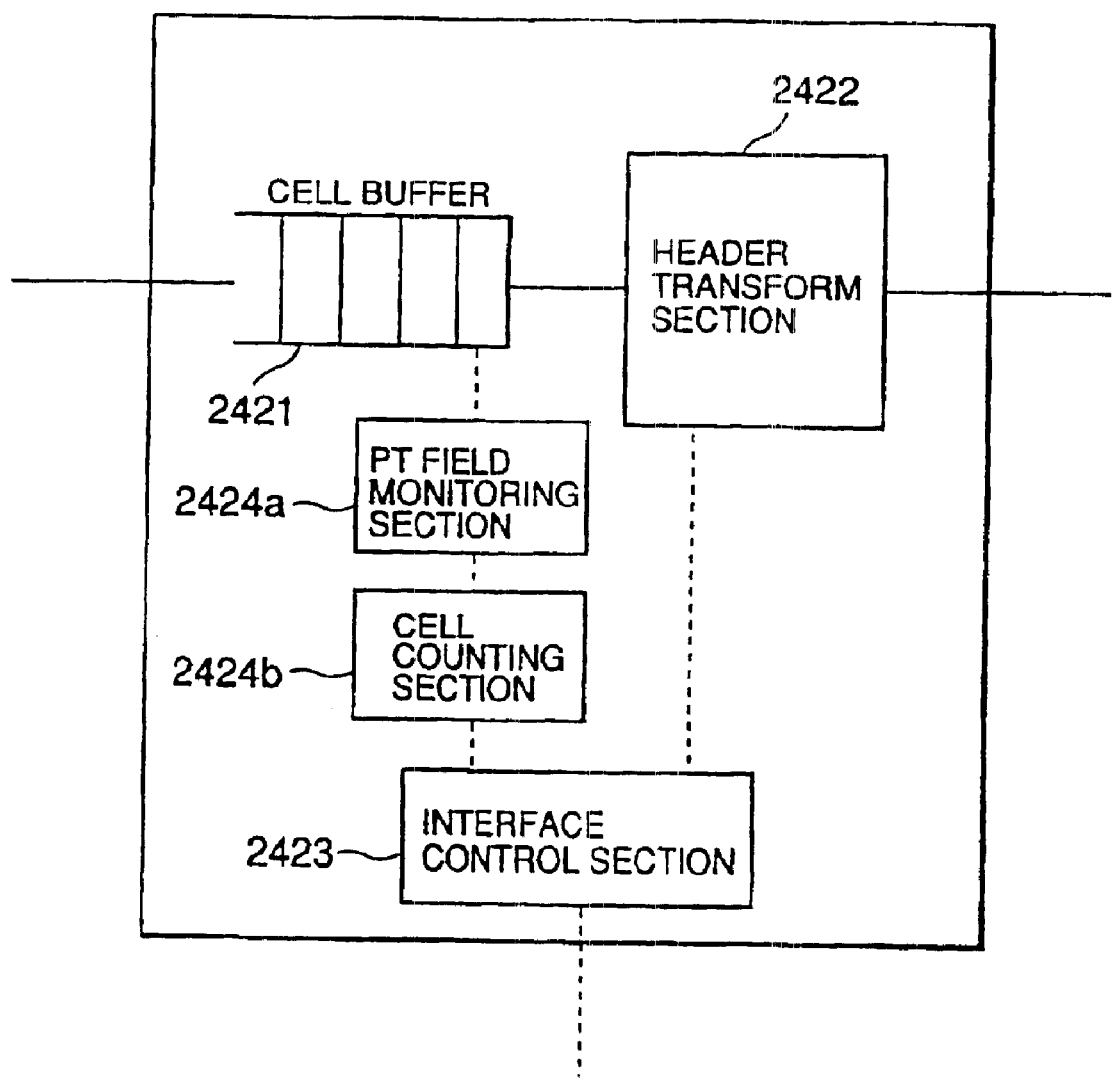
FIG. 27 is a view showing an internal structure of the ATM interface section 242.

Further, the PT field monitoring section 2424 may be provided with a function of investigating a cell flow and a timer function, by replacing it with a PT field monitoring section 2424a and a cell flow monitoring section 2424b (FIG. 27). By this construction, in the case that a virtual connection change request arrives between packets, if the cell counting section 2424b does not count a cell flow for a given period of time, it is possible to change virtual connections without awaiting processing of a subsequent packet.

Figure 12:
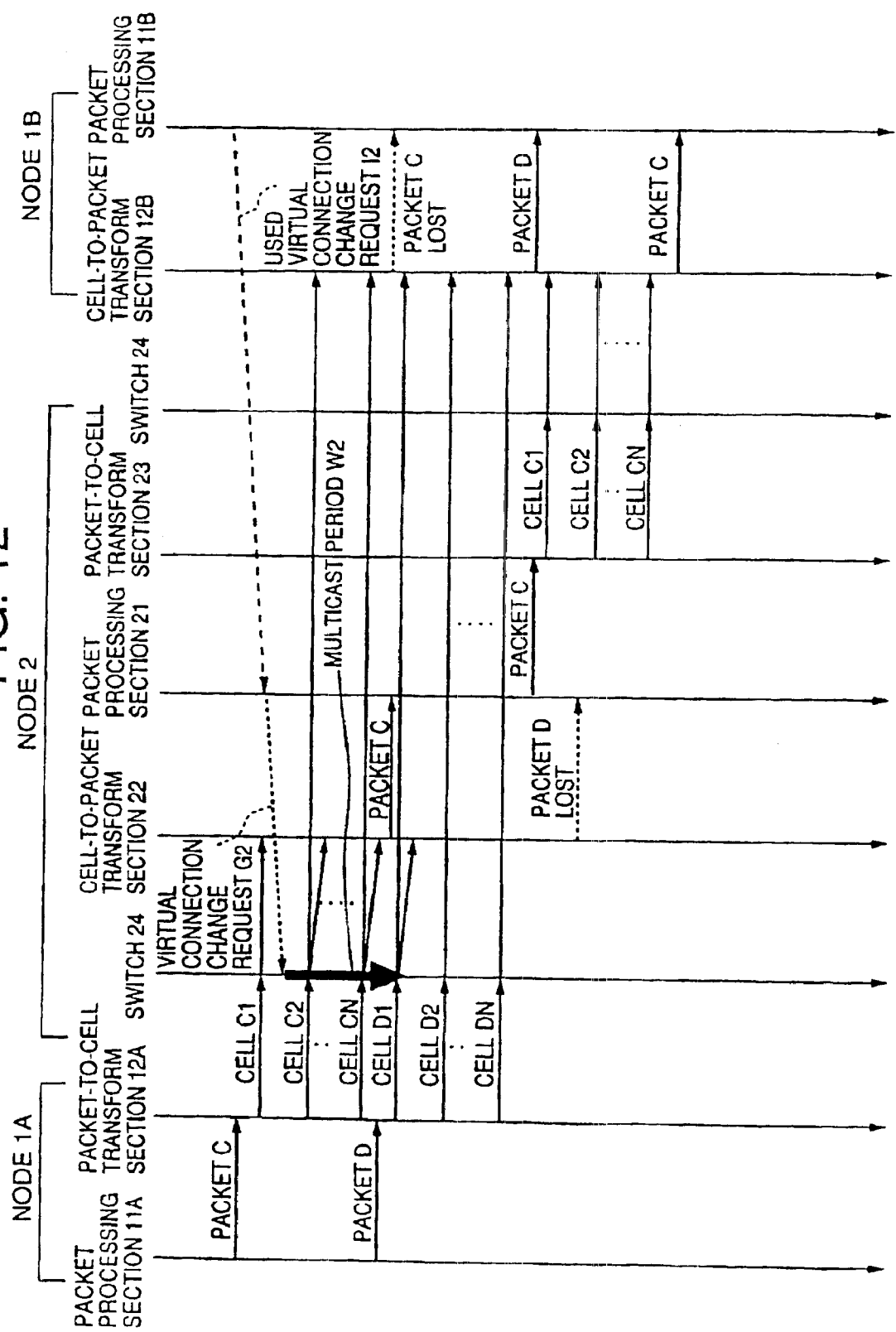
FIG. 12 is a sequence diagram in the case where multicast period W2 is set.

FIG. 12 is a sequence diagram showing basic operation of the present invention. The packet D shown in FIG. 12 is a packet sent following the packet C. Here also, similarly to FIG. 10, a virtual connection change request G2 arrives after a cell C1 has been processed. The switch section 24 resets the virtual connection VC53, which, at this point in time, is destined for the cell-to-packet assembly section 22 of the node 2, so that the virtual connection VC53 is destined for the cell-to-packet assembly section 12B of the node 1B, in addition to the cell-to-packet assembly section 22, by a multicast function. The operation can be seen from FIG. 12 by noting a multicast period W2. Namely, after completing transmission of a sufficient number (n in this example) of cells for the maximum length of packets, setting of the destination to the cell-to-packet assembly section 22 is eliminated in the virtual connection VC53, leaving only the virtual connection VC53' destined for the cell-to-packet section 12B. Although the packet D is discarded in the cell-to-packet assembly section 22 once, and the packet C is discarded in the cell-to-packet assembly section 12B once, both the packet C and packet D arrive at the node 1B in the result. Thus, the communication is performed normally on the packet level.

Figure 20:
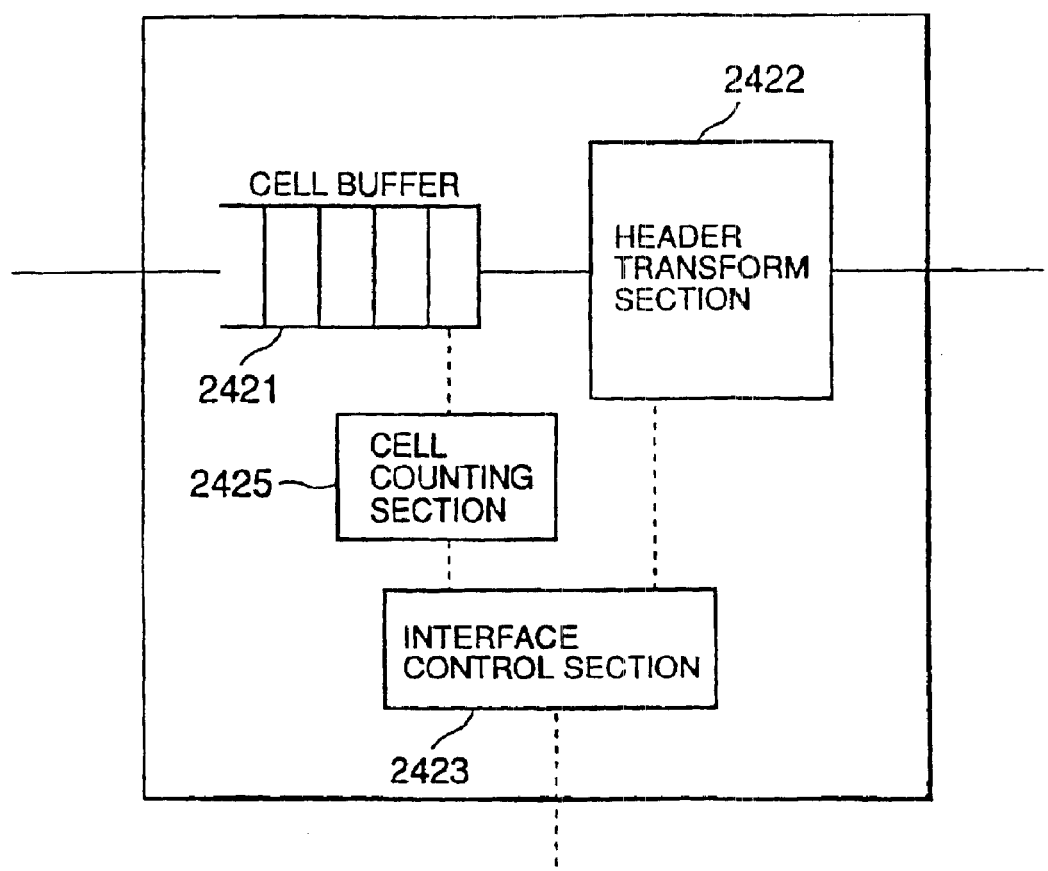
FIG. 20 is a view showing an internal structure of the ATM interface section 242 provided with a cell counting section.

FIG. 20 is a view illustrating an internal structure of the ATM interface section 242 on the input side, according to the present invention. It differs from FIG. 17 in that the PT field monitoring section 2424 is replaced by a cell counting section 2425.

Figure 21:
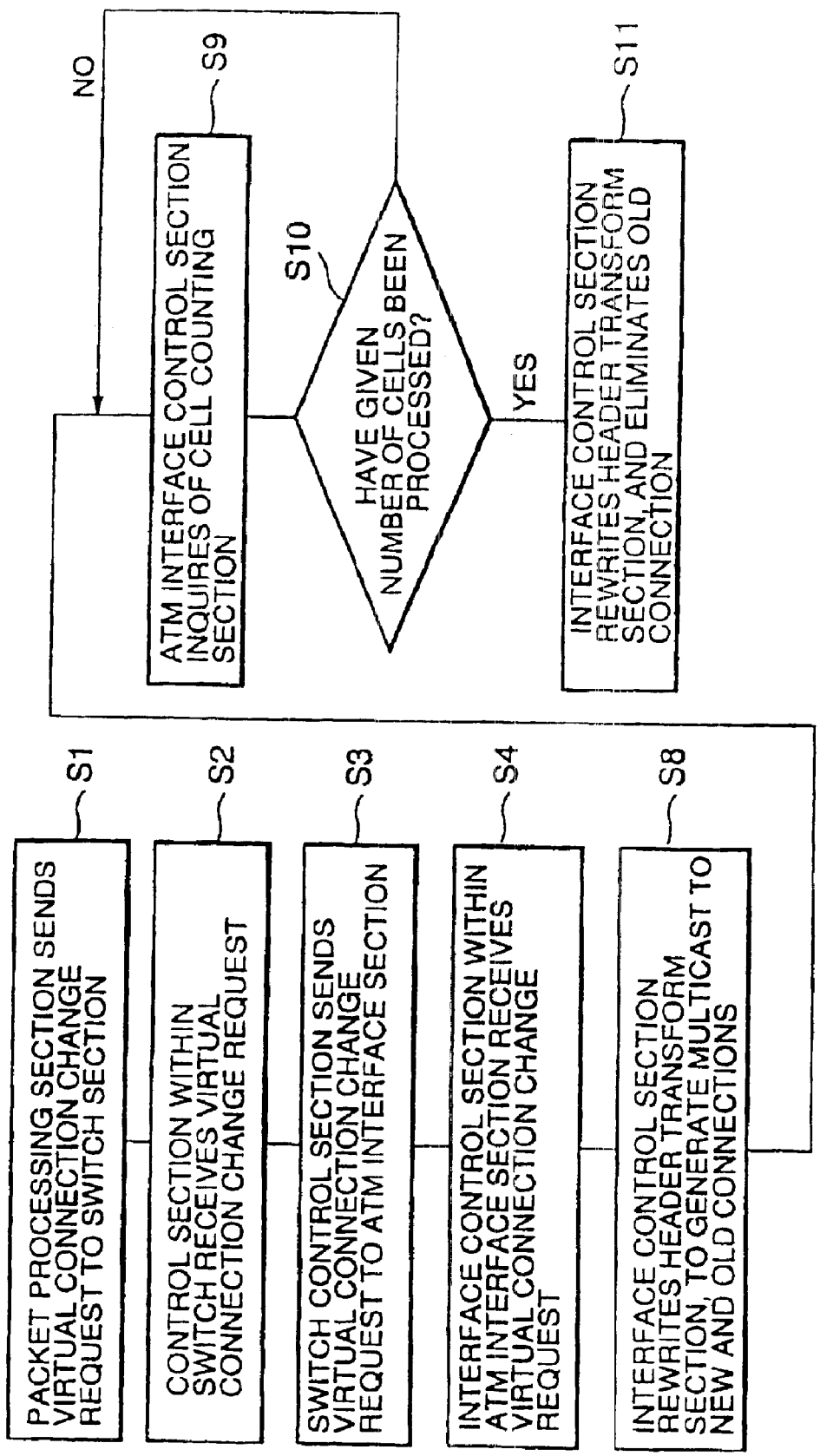
FIG. 21 is a flowchart showing a virtual connection change procedure which includes counting of cells.

FIG. 21 is a flowchart showing an example of a procedure for changing virtual connections using the cell counting section. It is the same as FIG. 18 up to Step S4. Thereafter, the ATM interface control section 2423, which has received the virtual connection change request from the switch control section 243, rewrites the table of the header transform section 2422 so that, while maintaining the virtual connection before the change, the same cell is also multicasted onto the virtual connection after the change (Step S8). Then, the ATM interface control section 2423 inquires of the cell counting section 2425 about the current number of cells (Step S9). Based on a response from the cell counting section 2425, the interface control section 2423 judges if a given number of cells have been processed (Step S10). Judging that the given number of cells have been processed, the interface control section 2423 eliminates an entry representing the virtual connection before the change from the table of the header transform section 2422 (Step S11), completing the processing of changing the virtual connections.

Figure 22:
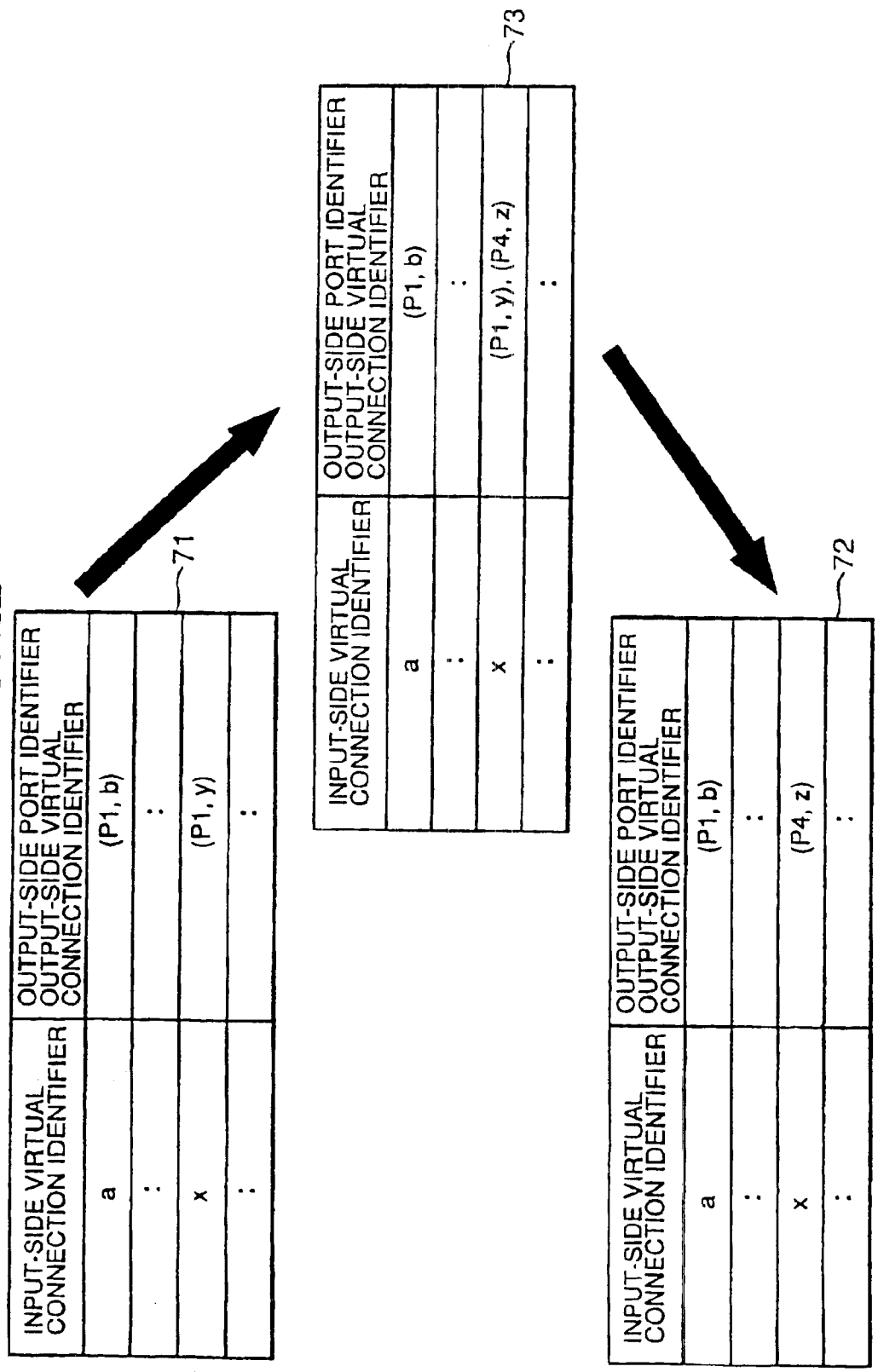
FIG. 22 is a view showing an example of rewriting a head transform table in the case of using the multicast system.

FIG. 22 shows an example of rewriting the head transform table in the multicast system. It differs from FIG. 19 in that there exists a period of multicast processing as shown by an entry 73. Some cells disassembled from the packet C generated in the sending node 1A arrive at the receiving node 1B in duplicate. A larger number of the duplicate cells is preferred for preventing packet loss and retransmission due to packet loss. On the other hand, from the viewpoint of packet processing in the IP switch and a transfer rate of the network, it is more desirable if a smaller number of cells are transferred in duplicate, i.e., multicasted.

To obtain the above-described given number for cells, the maximum length of packets generally used in an IP network system, i.e., 1500 byte, may be taken into consideration. This number 1500 is divided by 48 bytes, the length of the payload of the ATM cell, raised to a unit, and added with the length of 1 cell of the AAL5 trailer, giving 32, which may be considered an effective value of the given number for cells. Further, when, 65,536 bytes, the maximum length of packets in AAL5 is taken, 1,367 may be considered as the effective value.

Figure 13:
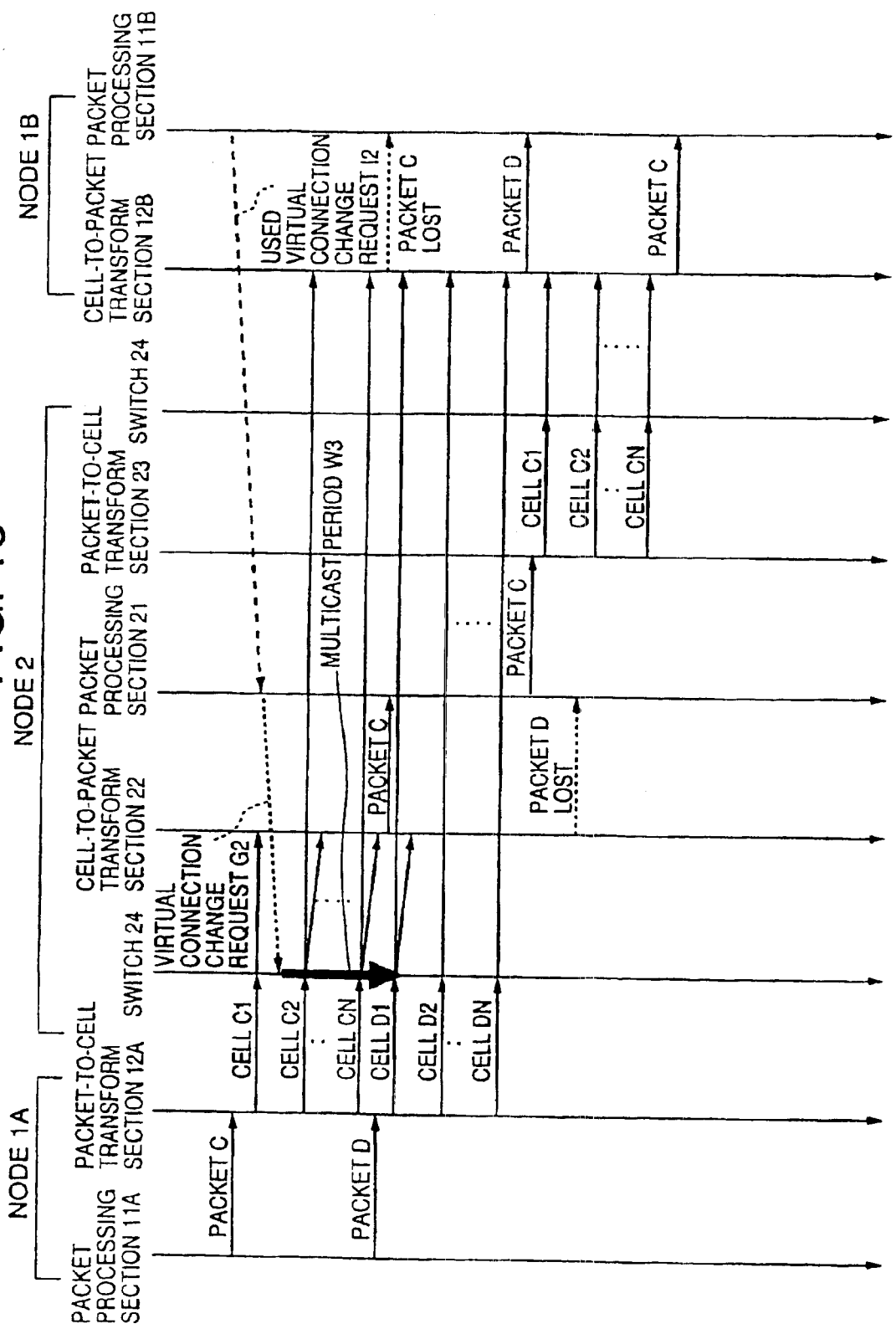
FIG. 13 is a sequence diagram in the case where multicast period W3 is set.

FIG. 13 is basically similar to FIG. 12 except that a multicast period W3 is fixed as a given period of time, with its length not being dynamically changed depending on the number of cells.

Figure 23:
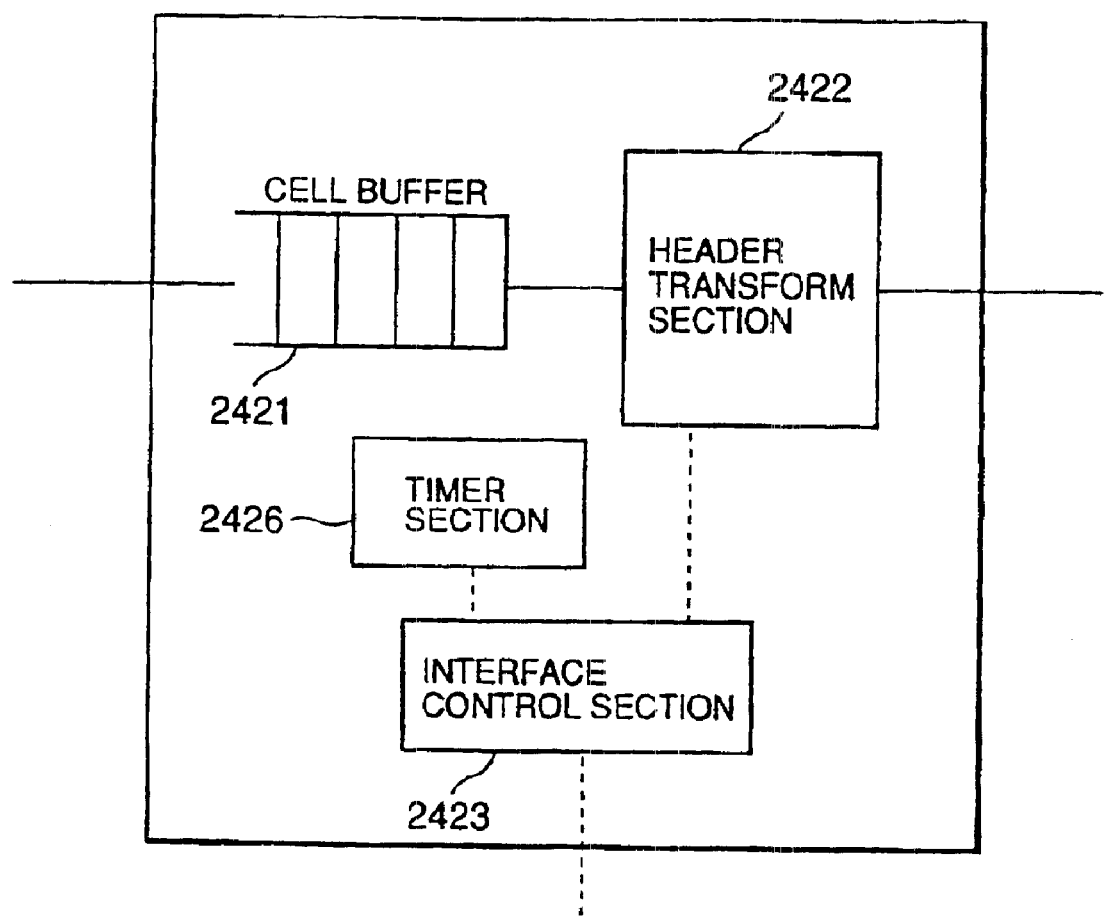
FIG. 23 is a view showing an internal structure of the ATM interface section 242 provided with a timer section.

FIG. 23 is a view illustrating an internal structure of the ATM interface section 242 on the input side, according to the present invention. Differently from FIGS. 17 and 20, a timer section 2426 is provided, and the cell buffer is not monitored.

Figure 24:
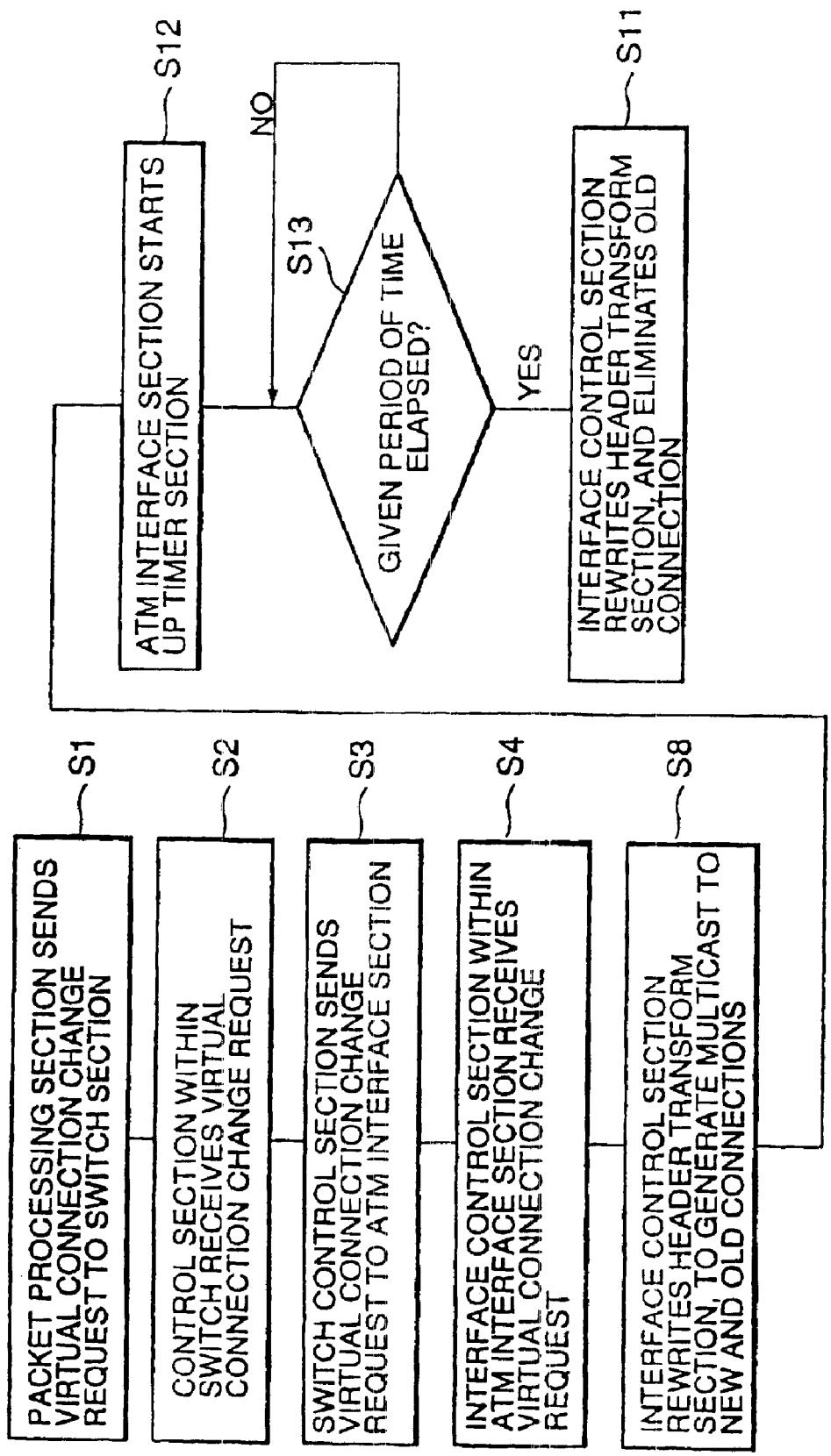
FIG. 24 is a flowchart showing a virtual connection change procedure using the timer section.

FIG. 24 is a flowchart showing an example of a procedure for changing virtual connections in the present embodiment. It is similar to FIG. 21 except that the timer section 2426 is started up, instead of the cell counting section 2425 (Step S12), and that, awaiting the timer expiration, which is notified by a signal from the timer section 2426 (Step 13), the virtual connection before the change is eliminated.

Rewriting of the header transform table in the present embodiment is similar to FIG. 22 which is the example for the embodiment 2.

Figure 25:
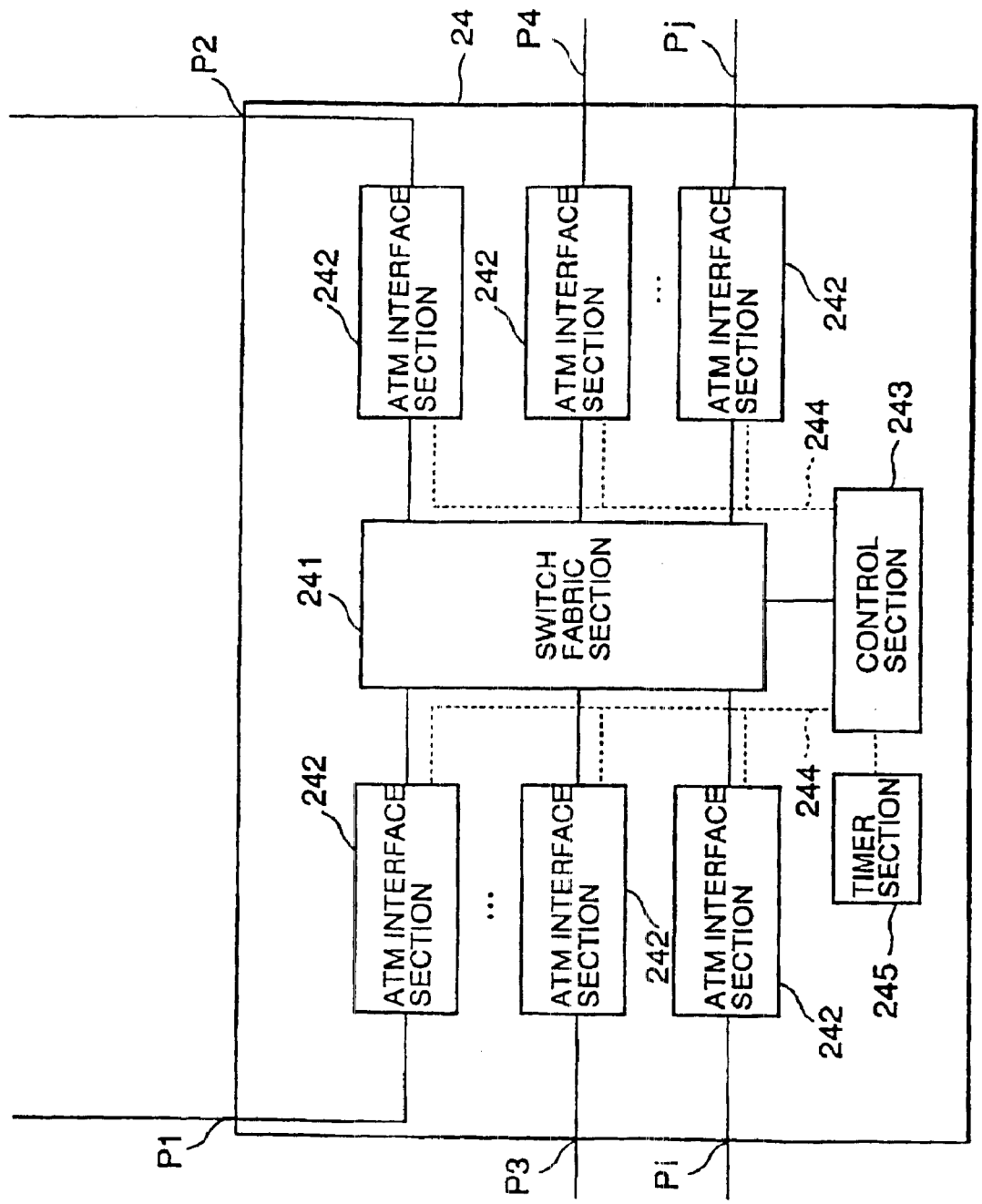
FIG. 25 is a view showing an internal structure of the switch section provided with the timer section.

FIG. 25 shows an internal structure of the switch section 24, according to the present invention. Differently from the embodiments described heretofore, a timer section 245 is connected to the switch control section 243. By this construction, it is not necessary to add a new structure to the ATM interface section 242.

Figure 26:
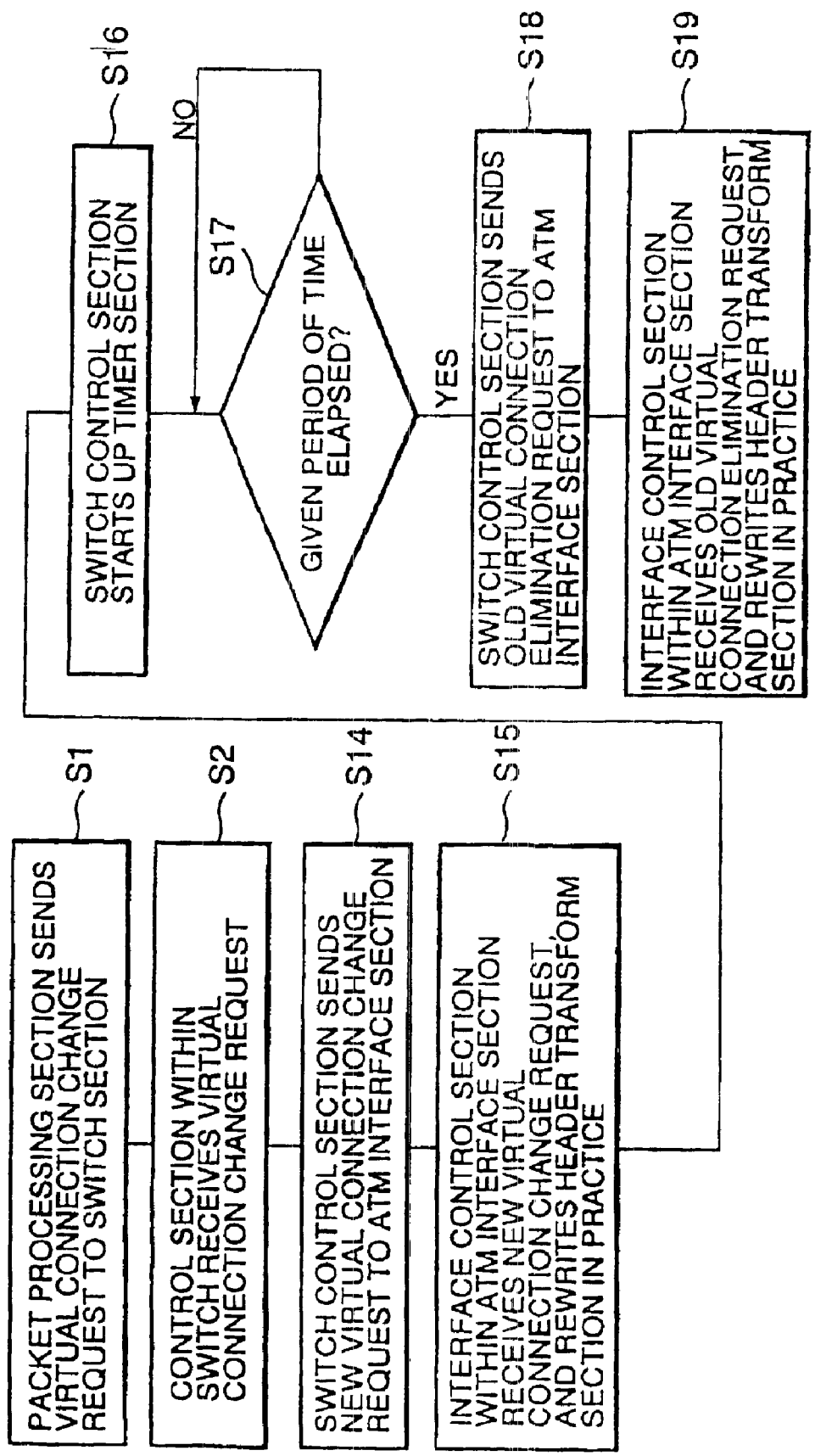
FIG. 26 is a flowchart showing a virtual connection change procedure in the case where the switch section is provided with the timer section.

FIG. 26 is a flowchart showing an example of a procedure for changing virtual connections. It is the same as the above-described flowcharts up to Step S2. Thereafter, first, the switch control section 243, which has received a virtual connection change request, sends a request for setting a virtual connection after the change to the ATM interface section 242 (Step S14). On receiving that request, the interface control section 2423 within the interface section 242 rewrites the table of the header transform section 242 in accordance with the request. As a result, virtual connections are generated for multicasting both to the virtual connection before the change and to the virtual connection after the change (Step S15). Thereafter, the switch control section 243 starts up the timer section 245 (Step S16), and awaits a timer expiration signal (Step S17). When the timer expires, then, the switch control section 243 sends a request for eliminating the virtual connection before the change to the ATM interface section (Step S18). On receiving the request, the interface control section 2423 within the interface section eliminates the entry related to the virtual connection before the change from the table of the header transform section 2422 (Step S19), completing the process of changing the virtual connections.

Rewriting of the header transform table in the present invention is similar to FIG. 22 which is the example for the embodiments 2 and 3-1.

According to the first invention, it is possible to prevent packet loss at the time of changing virtual connections. Advantageously, at that time, it is not necessary to transfer useless cells.

According to the second invention, it is possible to prevent packet loss at the time of changing virtual connections. Advantageously, in the case that the ATM switch supports the multicast function and the ATM interface section is provided with the cell counting section in advance, the invention can be implemented without addition of special hardware.

According to the third invention, it is possible to prevent packet loss at the time of changing virtual connections. Advantageously, this system does not require any circuit for high speed processing such as searching of the cell buffer's contents, and has a high degree of freedom in its construction.

What is claimed is:

1. A packet communication apparatus comprising:
    a receiving port which receives first packets;
    a switch which switches the first packets received at the receiving port;
    a first packet transform section which receives, through the switch section, the first packets received by the receiving port, and assembles the first packets into a second packet;
    a packet processing section which processes the second packet transformed from the first packets by the first packet transform section;
    a second packet transform section which disassembles the second packet processed by the packet processing section into the first packets and sends the first packets to the switch; and
    a sending port which receives the first packets sent from the second packet transform section through the switch, and sends the first packets;
    wherein the switch which sets a first virtual connection which leads through the first packet transform section, the packet processing section and the second packet transform section for transferring the received the first packets through the sending port, and which sets a second virtual connection which leads through the switch for transferring the received the first packets to the sending port;
    wherein the switch transfers the received the first packets with the first virtual connection until the first packets comprising the second at least one packet of data have been switched, when the switch receives a virtual connection change request received from the packet processing section to change from the first virtual connection to the second virtual connection.

2. A packet communication apparatus to claim 1, wherein the packet communication apparatus comprises:
    a plurality of receiving ports; and
    a plurality of sending ports.

3. A packet communication apparatus according to claim 1, wherein said first packets are ATM cells.

4. A packet communication apparatus according to claim 3, wherein said switch comprises:
    a field monitoring section which monitors a specific field within a header of a received ATM cell for changing said first virtual connection to said second vitual connection, based on said virtual connection change request, after the switch receives said virtual connection change request, and after said field monitoring section detects that a value of a specific field within a header of a received cell indicated a final cell of said second packet.

* * * * *